United States Patent
Ling et al.

(10) Patent No.: US 10,033,829 B2
(45) Date of Patent: Jul. 24, 2018

(54) INTEGRATED SCHEDULING OF GENERAL MESSAGES AND TIME-CRITICAL MESSAGES

(71) Applicant: The Boeing Company, Chicago, IL (US)

(72) Inventors: Yong-Long Ling, Bellevue, WA (US); Guijun Wang, Issaquah, WA (US); Dongliang Lin, Bellevue, WA (US); Changzhou Wang, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 363 days.

(21) Appl. No.: 14/832,783

(22) Filed: Aug. 21, 2015

(65) Prior Publication Data

US 2017/0054828 A1 Feb. 23, 2017

(51) Int. Cl.
*G06F 15/16* (2006.01)
*H04L 29/08* (2006.01)

(52) U.S. Cl.
CPC ............ *H04L 67/32* (2013.01); *H04L 67/325* (2013.01); *H04L 67/10* (2013.01)

(58) Field of Classification Search
CPC ....... H04L 67/32; H04L 67/10; H04L 67/325; H04L 29/08
See application file for complete search history.

(56) References Cited

U.S. PATENT DOCUMENTS

| | | | | |
|---|---|---|---|---|
| 2006/0187836 A1* | 8/2006 | Frey | ..................... | H04L 41/0896 370/235 |
| 2007/0082689 A1* | 4/2007 | Talty | ..................... | H04L 12/189 455/518 |
| 2008/0025250 A1* | 1/2008 | Wang | ..................... | H04W 68/02 370/328 |
| 2011/0167147 A1* | 7/2011 | Andersson | .......... | H04L 43/0858 709/224 |
| 2015/0163149 A1* | 6/2015 | Norlander | ............... | H04L 47/12 370/392 |
| 2016/0056905 A1* | 2/2016 | Hartlmueller | ..... | H04L 12/40032 375/354 |

OTHER PUBLICATIONS

"Aircraft Data Network—Part 7: Avionics Full Duplex Switched Ethernet (AFDX) Network," Aeronautical Radio, Inc., ARINC Specification 664P7, Jun. 2005, 145 pages.
"AFDX/ARINC 664 Tutorial," Condor Engineering, Inc., copyright 2005, 55 pages.

* cited by examiner

*Primary Examiner* — Benjamin M Thieu
(74) *Attorney, Agent, or Firm* — Yee & Associates, P.C.

(57) ABSTRACT

A method, apparatus, and scheduling system for managing a mix of time-critical messages and general messages. Messages, which are referenced by message identifiers stored in a transmission queue buffer, are scheduled for transmission using a schedule configuration table. The schedule configuration table defines an order for processing a mix of time-critical messages and general messages. The messages are scheduled according to the characteristics for time-critical messages and general messages defined in columns of configuration tables and status tables. The messages that have been scheduled are transmitted from an end system in which the time-critical messages are prioritized during transmission over the general messages.

26 Claims, 12 Drawing Sheets

INTEGRATED SCHEDULING OF GENERAL MESSAGES AND TIME-CRITICAL MESSAGES

BACKGROUND INFORMATION

1. Field:

The present disclosure relates generally to the scheduling of messages. More particularly, the present disclosure relates to a method and apparatus for integrating the scheduling of general messages and time-critical messages in which the time-critical messages are scheduled using a control logic that is determined by a policy that is unique to the time-critical messages.

2. Background:

Multiple end systems may communicate over a network by exchanging messages. These end systems may send and receive messages on behalf of applications hosted by the end systems. For example, a source end system may transmit messages that are sent to one or more destination end systems over the network. A destination end system may receive messages from one or more source end systems.

In an asynchronous deterministic network, the scheduling approach used by a source end system largely determines the end-to-end message latency of the asynchronous deterministic network. The end-to-end message latency includes an end system latency portion and a physical latency portion.

The end system latency portion may be the time interval from the time of completion of the writing of a message by an application to an end system to the time of completion of the transmission of the message by the end system to a switch system in the asynchronous deterministic network. The switch system may then route the message in the form of one or more packets to the intended destination or destinations. The latency that occurs in the physical components of the switch system is the physical latency portion of the end-to-end message latency of the asynchronous deterministic network.

Messages transmitted within an asynchronous deterministic network may include different types of messages. With some currently available scheduling approaches, general messages are scheduled according to bandwidth allocation gaps (BAG) associated with the communications links over which these messages are sent. A bandwidth allocation gap is a minimum time of separation between two packets in a flow of packets.

However, some types of messages may be more time-sensitive than others and may require precise timing. For example, safety messages, emergency alert messages, and other types of messages containing time-sensitive information may need to be prioritized over general messages.

Currently available scheduling approaches may treat time-critical messages in the same manner as general messages. For example, these scheduling approaches may not take into account certain characteristics of time-critical messages, which include, but are not limited to, the periodic arrival, static ordering, burst time and other parameters according to which these messages may need to be served.

Consequently, applications that depend on the precise timing of certain messages may be relegated to dealing with frequent delays and the unpredictable ordering of time-critical messages. Therefore, it would be desirable to have a method and apparatus that take into account at least some of the issues discussed above, as well as other possible issues.

SUMMARY

In one illustrative example, a method is provided for managing messages. Messages, which are referenced by message identifiers stored in a transmission queue buffer, are scheduled for transmission using a schedule configuration table and a control logic for handling unavailable time-critical messages. The schedule configuration table defines an order for processing a mix of time-critical messages and general messages. The messages that have been scheduled are transmitted from an end system. The time-critical messages are prioritized during transmission over the general messages.

In another illustrative example, an apparatus comprises a memory and a scheduler. The memory includes a transmission queue buffer. The memory stores a schedule configuration table that defines an order for processing a mix of time-critical messages and general messages. The scheduler schedules messages referenced by message identifiers stored in the transmission queue buffer for transmission using the schedule configuration table.

In yet another illustrative example, a scheduling system comprises a transmission queue buffer, a schedule configuration table, and a scheduler. The transmission queue buffer has a plurality of sections in which one section of the plurality of sections is prefilled with time-critical message identifiers. The schedule configuration table defines an order for processing a mix of time-critical messages and general messages. The scheduler schedules messages referenced by message identifiers stored in the transmission queue buffer for transmission based on the order defined in the schedule configuration table.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
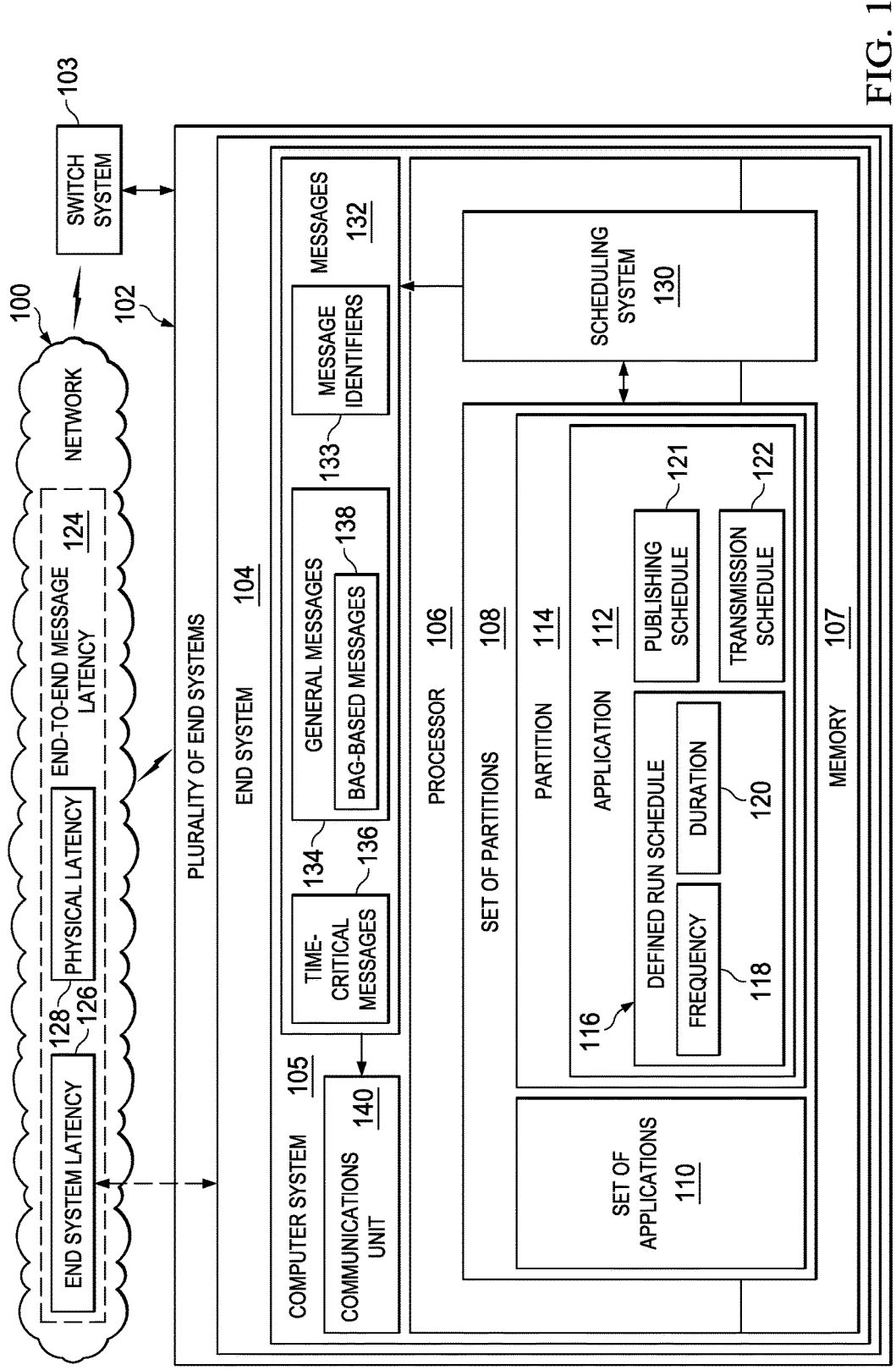
FIG. 1 is an illustration of a block diagram of a network in accordance with an illustrative embodiment.

The illustrative embodiments recognize and take into account different considerations. For example, the illustrative embodiments recognize and take into account that it may be desirable to have a method and apparatus for integrating the scheduling of both general messages and time-critical messages. In particular, it may be desirable to have a scheduling approach that seamlessly combines the scheduling of general messages and time-critical messages such that time-critical messages are scheduled in a predictable and deterministic manner with little to no impact on overall end-to-end message latency. Further, it may be desirable to prioritizes time-critical messages without unduly impacting the scheduling of general messages.

Thus, the illustrative embodiments provide a method and apparatus for unifying the scheduling of general messages and time-critical messages. In one illustrative example, this unified scheduling approach may be used for scheduling messages that are published by real-time applications in local area networks. A real-time application is an application that operates within a time frame that the user, whether human or some other application, senses as immediate or current. The latency of a real-time application is typically guaranteed to be less than a predefined value, which may be measured in seconds, microseconds, or nanoseconds.

The illustrative embodiments provide a scheduling system that uses a set of unified scheduling tables that combine information for both general messages and time-critical messages. This set of unified scheduling tables allows time-critical messages to be accommodated with special time-critical scheduling, while maintaining compatibility with traditional methods of scheduling general messages. In one illustrative example, the set of unified scheduling tables includes a schedule configuration table that is predefined and fixed and a schedule status table that is dynamic and updatable.

The scheduling system provided by the different illustrative embodiments uses a transmission queue buffer (TX-QBUFF) that is organized based on virtual links. For example, the transmission queue buffer may be divided into a plurality of sections, each of which may correspond to a different virtual link. A virtual link defines a logical flow of data from one source end system to one or more destination end systems.

When a new message is generated by an application, a writer uses a message identifier that is associated with the message to find a position in a message buffer at which the message is to be written. This position may be found using a message status table and a message configuration table. The writer then writes the message to the message buffer.

Thereafter, the writer determines whether the message belongs to the category of general messages or the category of time-critical messages. In particular, the writer uses the message identifier to ultimately look up a scheduling type for the message. The scheduling type may be a time-critical scheduling type or a general scheduling type.

If the message is a general scheduling type, the writer adds the message identifier to a position in the transmission queue buffer. This position is determined using a queue configuration table and a queue status table.

If the message is a time-critical scheduling type, no other action need be taken by the writer. The message identifiers for new time-critical messages may not need to be added to the transmission queue buffer because at least one section of the transmission queue buffer is statically preconfigured with message identifiers that reference time-critical messages. For example, the message identifiers for time-critical messages may be prefilled within a section of the transmission queue buffer in a predetermined order. This type of preconfiguration of the transmission queue buffer enables a static ordering of the message identifiers used to reference time-critical messages. In this manner, interference issues and order unpredictability issues may be avoided.

The scheduling system provides for time-critical scheduling according to the static ordering of the message identifiers in the transmission queue buffer. This type of scheduling may ensure that messages are served in a predetermined order with predictable latency characteristics.

Further, the scheduling system allows for the behavior of time-critical scheduling to be fine-tuned using different policies. The particular policy to be used for handling a time-critical message may be determined by a policy attribute of the queue configuration table. By using policies to control the behavior of the time-critical scheduling, the timing associated with scheduling may be better matched to message availability.

In this manner, the illustrative embodiments provide a method and apparatus that integrates the scheduling of time-critical messages with general messages to serve time-critical messages predictably and deterministically. In one illustrative example, a method is provided for managing the scheduling and transmission of messages. In this illustrative example, messages, which are referenced by message identifiers stored in a transmission queue buffer, are scheduled for transmission using a schedule configuration table. The schedule configuration table defines an order for processing a mix of time-critical messages and general messages. Further, the messages that have been scheduled are transmitted from an end system in which the time-critical messages are prioritized during transmission over the general messages.

Referring now to the figures and, in particular, with reference to FIG. 1, an illustration of a block diagram of a network is depicted in accordance with an illustrative embodiment. Network 100 is a telecommunications network over which data is exchanged between end systems. This data may be transmitted along data links that are established using cable media, wireless media, or a combination of the two.

In one illustrative example, network 100 takes the form of an asynchronous, deterministic network. This type of asynchronous, deterministic network may be used for safety-critical and mission-critical avionic systems.

As depicted, plurality of end systems 102 and switch system 103 may connect to network 100. In some cases, plurality of end systems 102, switch system 103, or both may be considered part of network 100. Plurality of end systems 102 may communicate with each other over network 100. For example, plurality of end systems 102 may exchange messages between each other over network 100. An end system in plurality of end systems 102 may take the form of, for example, without limitation, a processor module, a processing unit, a microprocessor, a computer system, a laptop, a smartphone, a tablet, or some other type of computing system or user device. Further, an end system in plurality of end systems 102 may be capable of sending one or more messages to one or more other end systems over network 100.

Depending on the implementation, plurality of end systems 102 may be distributed over an extended physical area or a limited physical area. As one illustrative example, network 100 may take the form of a local area network for an aircraft. In this example, plurality of end systems 102 may include multiple processor modules that are physically distributed throughout the aircraft. These multiple processor modules may be connected through network 100 and communicate over an avionic data network.

In one illustrative example, each end system in plurality of end systems 102 uses a scheduling system to schedule and transmit packetized messages according to bandwidth constraints and time constraints. Further, each end system in plurality of end systems 102 may provide at least one network interface for transmitting packets and receiving packets.

Switch system 103 interconnects plurality of end systems 102 and enables the routing of packetized messages to intended destinations over network 100. Switch system 103 may include at least one of a switch device, a routing device, a hub, a computing device, or some other type of networking device.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; item C; item B and item C, or some other suitable combination. In some cases, "at least one of item A, item B, or item C" or "at least one of item A, item B, and item C" may mean, but is not limited to, two of item A, one of item B, and ten of item C; four of item B and seven of item C; or some other suitable combination.

End system 104 may be an example of one of plurality of end systems 102. In one illustrative example, end system 104 takes the form of computer system 105 that comprises one or more computers. When computer system 105 includes multiple computers, these computers may be in communication with each other.

As depicted, end system 104 includes processor 106 and memory 107. Processor 106 may be a single core processor or a multi-core processor, depending on the implementation. Further, memory 107 may include any number of or any combination of data storage components.

In one illustrative example, processor 106 and memory 107 are partitioned with respect to time and space to form set of partitions 108 for set of applications 110. In particular, each partition in set of partitions 108 may be designated for a corresponding application in set of applications 110. As used herein, a "set of" items may include one or more items.

In this manner, set of partitions 108 includes one or more partitions and set of applications 110 includes one or more applications.

In one illustrative example, when network 100 is implemented on an aircraft, the partitioning of processor 106 and memory 107 may be based on the Aeronautical Radio, Incorporated (ARINC) specification 653. In other illustrative examples, some other standard or specification may be used to determine the partitioning of processor 106 and memory 107.

In one illustrative example, each application in set of applications 110 runs in a corresponding partition of set of partitions 108 of end system 104, independently of any other applications in set of applications 110. Further, in this illustrative example, no two applications in set of applications 110 may run in the same partition.

Application 112 is an example of one of set of applications 110 that runs on end system 104. In particular, application 112 runs in partition 114 of set of partitions 108. In one illustrative example, application 112 takes the form of a real-time application.

Application 112 may be configured to publish messages, subscribe to messages, or both. Publishing messages may include transmitting messages in the form of packets that are disseminated to one or more destinations over network 100. Subscribing to messages may include receiving messages in the form of packets from one or more sources over network 100.

Application 112 may have defined run schedule 116. In one illustrative example, defined run schedule 116 includes frequency 118 and duration 120. Frequency 118 defines how often application 112 runs. Duration 120 defines the period of time over which application 112 runs each time. As one illustrative example, frequency 118 for application 112 may be about 20 Hertz and duration 120 for application 112 may be about 5 milliseconds such that application 112 runs for about 5 milliseconds, about once every 50 milliseconds.

Application 112 may also have publishing schedule 121 and transmission schedule 122. Publishing schedule 121 defines the rate at which application 112 publishes messages. As one illustrative example, publishing schedule 121 may be set such that application 112 publishes messages at a rate of about 10 Hertz. In this manner, one copy of a message is published about every 100 milliseconds. In other words, application 112 may publish a copy of a message every other run cycle of application 112.

Transmission schedule 122 determines the transmission rate of packets. For example, one message may be packetized into a set of packets. Transmission schedule 122 may define the rate at which each individual packet is transmitted over network 100.

In these illustrative examples, end-to-end message latency 124 in network 100 is the overall time period between the writing and sending of a message from one end system to the receiving and reading of the message by another end system. End-to-end message latency 124 is based on end system latency 126 for each end system in plurality of end systems 102 and physical latency 128. Physical latency 128 may be the latency that occurs due to the physical components that make up switch system 103.

End system latency 126 may be associated with each particular end system in plurality of end systems 102. For example, end system latency 126 for end system 104 may be the time period between a first time at which end system 104 finishes writing a message to a second time at which transmission of the message by end system 104 to switch system 103 has been completed. End system latency 126 may be mostly determined by the scheduling approach used by end system 104.

In one illustrative example, end system 104 uses scheduling system 130 to schedule the transmission of messages 132 published by set of applications 110 and to transmit messages 132. Scheduling system 130 may be configured to reduce end system latency 126, thereby reducing end-to-end message latency 124.

Scheduling system 130 may be implemented using hardware, firmware, software, or some combination thereof. In one illustrative example, scheduling system 130 may be implemented using a portion of both processor 106 and memory 107.

Messages 132 are referenced by message identifiers 133. Messages 132 may include general messages 134 and time-critical messages 136. General messages 134 may also be referred to as regular messages and may be referenced by general message identifiers. In one illustrative example, general messages 134 are messages that are scheduled based on defined bandwidth allocation gaps (BAG). In this manner, general messages 134 may also be referred to as BAG-based messages 138.

Time-critical messages 136 are messages that are referenced by time-critical message identifiers and that are, for example, without limitation, time-sensitive due to the type of message. For example, time-critical messages 136 may include, but are not limited to, at least one of safety messages, emergency alert messages, time synchronization messages, or some other type of message for which precise timing is preferred.

Scheduling system 130 is configured to handle both general messages 134 and time-critical messages 136 in a unified manner. In particular, the scheduling of general messages 134 and the scheduling of time-critical messages 136 are integrated such that time-critical messages 136 are scheduled in a predictable and deterministic manner and prioritized during transmission with minimal to no impact on the service time and latency for general messages 134. Scheduling system 130 is described in greater detail in FIG. 2 below.

With reference still to FIG. 1, communications unit 140 of end system 104 is used to transmit messages 132 that have been scheduled using scheduling system 130. Communications unit 140 may provide communications through physical communications links, wireless communications links, or both.

Figure 2:
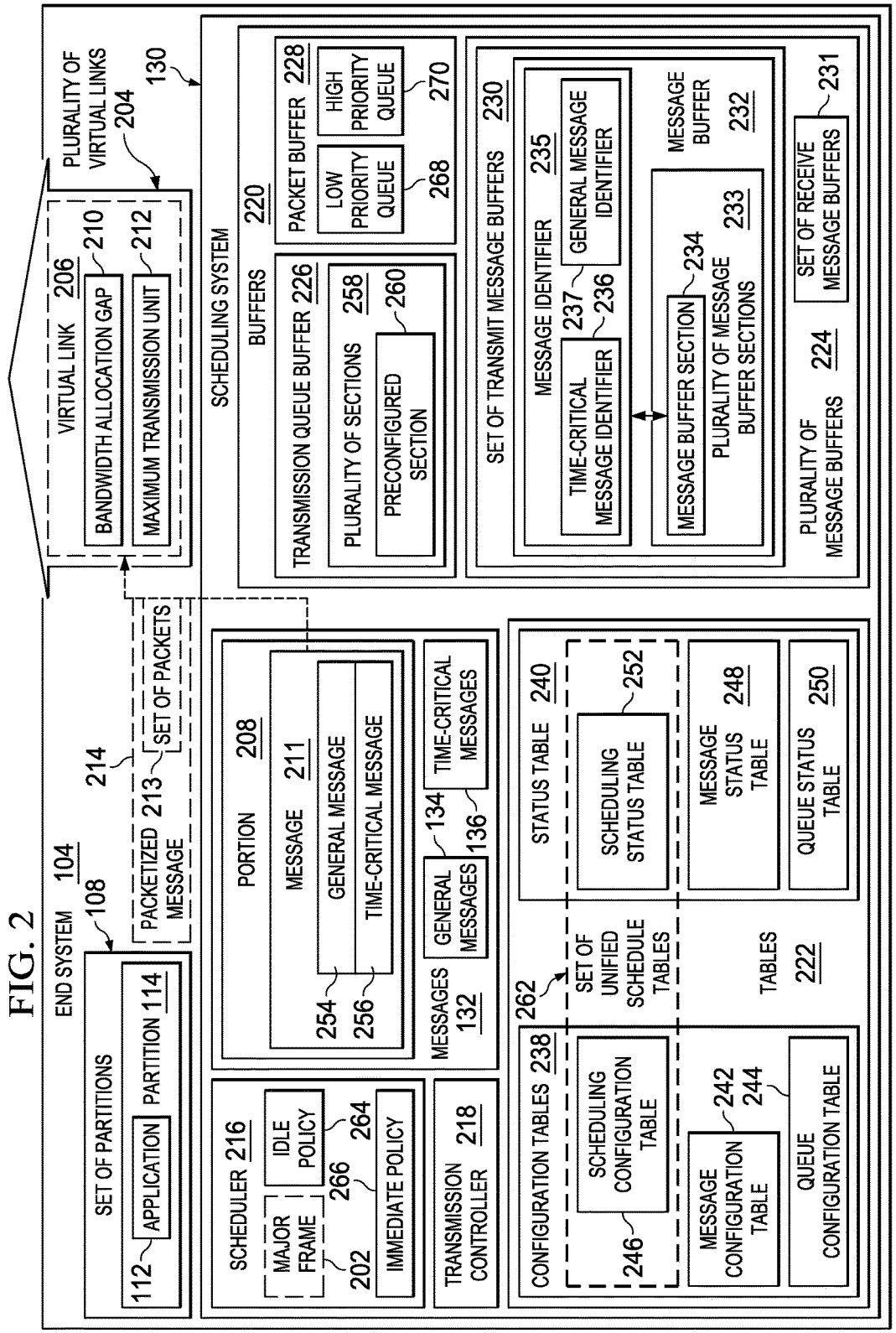
FIG. 2 is an illustration of a block diagram of a scheduling system in accordance with an illustrative embodiment.

With reference now to FIG. 2, an illustration of a block diagram of scheduling system 130 from FIG. 1 is depicted in accordance with an illustrative embodiment. In this illustrative example, scheduling system 130 is used to manage the scheduling of messages 132 published by set of applications 110 in FIG. 1 that run on set of partitions 108 in end system 104. In particular, scheduling system 130 is used to seamlessly integrate the scheduling and transmission of both time-critical messages 136 and general messages 134.

With scheduling system 130, time-critical messages 136 are considered static because time-critical messages 136 may be published at a fixed time relative to the start of each run cycle of application 112. General messages 134 may be considered static or dynamic. General messages 134 may be dynamic in that general messages 134 may and may not be published during a given run cycle of application 112.

Major frame 202 is the shortest time period during which all of the applications in set of applications 110 in FIG. 1 have run at least once and after which the run pattern for set of applications 110 repeats. Each repetition of this run pattern may be referred to as a major frame cycle. A time-critical message, such as one of time-critical messages 136, has a fixed, static time of readiness for scheduling relative to the start of each major frame.

Messages 132 may be grouped into plurality of virtual links 204. Each virtual link in plurality of virtual links 204 defines a logical flow of data from end system 104 to one or more destination end systems of plurality of end systems 102.

Virtual link 206 is an example of one of plurality of virtual links 204. In one illustrative example, portion 208 of messages 132 published by set of applications 110 in FIG. 1 are assigned to virtual link 206. Portion 208 of messages 132 may include a portion of general messages 134, a portion of time-critical messages 136, or both.

Regardless of whether portion 208 of messages 132 includes time-critical messages, general messages, or both, virtual link 206 has bandwidth allocation gap (BAG) 210. Bandwidth allocation gap 210 defines the minimal separation time between two packets within virtual link 206.

Message 211 is an example of one message in portion 208 of messages 132 that is assigned for transmission along virtual link 206. Message 211 may be packetized based on maximum transmission unit (MTU) 212 of virtual link 206. Maximum transmission unit 212, which may also be referred to as a max transfer unit size, is the maximum size of a packet that can be transmitted along virtual link 206 without fragmentation. Message 211 is segmented into set of packets 213 based on maximum transmission unit 212 to form packetized message 214. Packetized message 214 is scheduled for transmission along virtual link 206 based on bandwidth allocation gap 210.

When virtual link 206 is used only for time-critical messages, bandwidth allocation gap 210 for virtual link 206 may be smaller than when virtual link 206 is used only for general messages. Further, time-critical messages may be, on average, smaller in size than general messages. For example, a time-critical message may be one, two, five, or ten packets in size, while a general message may be one to tens or hundreds of packets in size. An end system, such as end system 104, typically has many more general messages to transmit than time-critical messages.

Scheduling system 130 enables the concurrent scheduling of time-critical messages 136 and general messages 134 such that time-critical messages 136 are scheduled predictably and deterministically. Scheduling system 130 ensures that time-critical messages 136 are prioritized for transmission over general messages 134 without affecting the overall latency for general messages 134 more than desired.

In one illustrative example, scheduling system 130 includes scheduler 216, transmission controller 218, buffers 220, and tables 222. Scheduler 216 and transmission controller 218 may be implemented using hardware, firmware, software, or a combination thereof. In this illustrative example, scheduler 216 and transmission controller 218 are implemented within processor 106 in FIG. 1.

Buffers 220 may be physical memory buffers. Each of buffers 220 may correspond to a region of memory 107 in FIG. 1. Buffers 220 include plurality of message buffers 224, transmission queue buffer 226, and packet buffer 228.

In this illustrative example, plurality of message buffers 224 may include buffers for both transmitting and receiving messages. In one illustrative example, plurality of message buffers 224 include set of transmit message buffers 230 and set of receive message buffers 231. In some illustrative examples, set of transmit message buffers 230 includes only a single transmit message buffer and set of receive message buffers 231 includes only a single receive message buffer.

Message buffer 232 is an example of one of set of transmit message buffers 230. Message buffer 232 may also be referred to as a transmit message buffer. Message buffer 232 may be divided into plurality of message buffer sections 233. Each message buffer section of plurality of message buffer sections 233 is associated with a message identifier. Each message buffer section of plurality of message buffer sections 233 may include multiple entries, or positions. Each entry in a message buffer section is associated with the same message identifier. Further, each entry in a message buffer section is a potential different instance of a message having the corresponding message identifier.

Message buffer section 234 is an example of one of plurality of message buffer sections 233. Message buffer section 234 is associated with message identifier 235. In other words, each entry in message buffer section 234 is associated with the same message identifier 235. Message identifier 235 may take the form of time-critical message identifier 236 or general message identifier 237.

When message identifier takes the form of time-critical message identifier 236, message buffer section 234 may be referred to as a time-critical message buffer section that is designated for holding time-critical messages that are to be transmitted. When message identifier takes the form of general message identifier 237, message buffer section 234 may be referred to as a general message buffer section that is designated for holding general messages that are to be transmitted.

Transmission queue buffer 226 is used to hold message identifiers corresponding to messages that are awaiting scheduling. Packet buffer 228 is used to hold packets that have been scheduled and are awaiting transmission.

Tables 222 include configuration tables 238 and status tables 240. Configuration tables 238 include message configuration table 242, queue configuration table 244, and schedule configuration table 246. Status tables 240 include message status table 248, queue status table 250, and schedule status table 252.

Configuration tables 238 are static in that the information in configuration tables 238 does not change over time. In other words, configuration tables 238 are fixed. However, status tables 240 are dynamic in that the information in status tables 240 does change over time. In other words, status tables 240 are updatable.

In one illustrative example, partition 114, which is designated for running application 112, writes message 211 into message buffer 232. Partition 114 uses the message identifier associated with message 211, along with message configuration table 242 and message status table 248, to determine where in message buffer 232 to write message 211. In particular, partition 114 determines the message buffer section of plurality of message buffer sections 233 and the particular entry within that message buffer section into which to write message 211.

In response to the writing of message 211 into message buffer 232, partition 114 updates message status table 248. Message status table 248 tracks new instances of messages in message buffer 232.

Partition 114 may use the message identifier associated with message 211, along with message configuration table 242 and queue configuration table 244, to determine whether message 211 is general message 254 or time-critical message 256. In this illustrative example, when message 211 takes the form of general message 254, partition 114 inserts the corresponding message identifier into transmission queue buffer 226. Partition 114 uses queue configuration table 244 and queue status table 250 to determine into which entry of which section of transmission queue buffer 226 the message identifier is to be written. Further, partition 114 updates queue status table 250.

However, when message 211 takes the form of time-critical message 256, the corresponding message identifier does not need to be added to transmission queue buffer 226 and an update to queue status table 250 is not required. These steps are not needed because the message identifier is already present within transmission queue buffer 226 at a fixed position.

As depicted, transmission queue buffer 226 may be divided into plurality of sections 258. Each section in plurality of sections 258 may correspond to one of plurality of virtual links 204. In some illustrative examples, each virtual link in plurality of virtual links 204 may include one or more sub-links. In these examples, each section in plurality of sections 258 may correspond to a different sub-link.

At least one section in plurality of sections 258 is statically preconfigured with time-critical message identifiers. As one illustrative example, plurality of sections 258 includes preconfigured section 260. Preconfigured section 260 is prefilled with time-critical message identifiers in a predetermined order. In this manner, when time-critical message 256 is written to message buffer 232, the corresponding message identifier already has a predetermined position in transmission queue buffer 226.

This predetermined ordering of time-critical message identifiers ensures that the corresponding time-critical messages will be served for scheduling in a predetermined order. In other words, unpredictable ordering for time-critical messages may be avoided.

As partition 114 writes messages into message buffer 232, scheduler 216 concurrently handles the scheduling of messages based on the message identifiers stored in transmission queue buffer 226. In particular, scheduler 216 schedules messages that are available for scheduling when the corresponding virtual links are eligible.

Scheduler 216 uses schedule configuration table 246 and schedule status table 252 to manage the scheduling of messages. Together, schedule configuration table 246 and schedule status table 252 form set of unified scheduling tables 262.

Both schedule configuration table 246 and schedule status table 252 have the same number of rows. The rows in schedule configuration table 246 correspond to the rows of schedule status table 252. As used herein, one row of a table may also be referred to as one entry of that table. Each pair of corresponding entries in schedule configuration table 246 and schedule status table 252 defines an independent virtual link.

Schedule configuration table 246 includes entries that define an order for processing a mix of general messages and time-critical messages. In particular, a subset of entries in schedule configuration table 246 are preconfigured for time-critical messages. Because the number of time-critical messages transmitted by an end system, such as end system 104, is typically far fewer than the number of general messages and size of each time-critical message is far smaller in size than the size of a general message, the subset of entries preconfigured for time-critical messages is smaller than a remaining portion of the entries in schedule configuration table 246 that are designated for general messages.

By strategically placing entries in schedule configuration table 246 that are for time-critical messages amidst a larger portion of entries that are for general messages, time-critical messages may be predictably and deterministically scheduled with minimal to no impact on overall latency. Further, this type of scheduling approach may allow a special approach to be used for time-critical messages within the context of traditional methods for scheduling general messages.

As previously described, each entry in schedule configuration table 246 corresponds to a virtual link. In particular, each entry in schedule configuration table 246 defines values for selected attributes for that virtual link. The values for these attributes for the different entries may differ depending on whether the virtual link is associated with a time-critical scheduling type or a general scheduling type.

When scheduler 216 serves a particular entry of schedule configuration table 246, scheduler 216 determines whether the corresponding virtual link is eligible for scheduling. If the virtual link is not eligible for scheduling, scheduler 216 proceeds to the next entry of schedule configuration table 246. However, if the virtual link is eligible, then scheduler 216 determines when a message is available for scheduling.

As one illustrative example, scheduler 216 retrieves a message identifier that corresponds to the virtual link using queue configuration table 244, queue status table 250, and transmission queue buffer 226. Scheduler 216 then uses message status table 248 to determine whether a new instance of a message associated with the retrieved message identifier is available for scheduling.

Once scheduler 216 determines that the virtual link is eligible and the new instance of a message for the corresponding message identifier is available, scheduler 216 processes the message. For example, scheduler 216 packetizes at least a portion of the message to form a packet and places the packet in packet buffer 228.

In one illustrative example, when the virtual link is of a time-critical scheduling type, scheduler 216 performs scheduling according to a policy that may be selected from one of idle policy 264 and immediate policy 266. The policy that is selected determines how scheduler 216 behaves when a new instance of a time-critical message as referenced by a time-critical message identifier is not available for scheduling. In other words, the policy selected determines the control logic used by scheduler 216 to handle unavailable instances of time-critical messages.

With idle policy 264, scheduler 216 strictly follows the predetermined order of the statically preconfigured entries of time-critical message identifiers in transmission queue buffer 226. Further, with idle policy 264, scheduler 216 has an allocated total time requirement for each entry in schedule configuration table 246.

For example, when scheduler 216 is serving a current entry of schedule configuration table 246, scheduler 216 is allocated a certain amount of time for the processing of a corresponding message. With idle policy 264, if the message is not available, scheduler 216 idles until the allocated total time has passed before serving the next entry of schedule configuration table 246. In this manner, idle policy 264 ensures that the next entry is not prematurely served.

Immediate policy 266 is similar to idle policy 264 in that scheduler 216 still strictly follows the predetermined order of the statically preconfigured entries of time-critical message identifiers in transmission queue buffer 226. However, with immediate policy 266, scheduler 216 does not have an allocated total time requirement. If, when serving a current entry of schedule configuration table 246, a message is not available, scheduler 216 is allowed to immediately move on to the next entry in transmission queue buffer 226.

In some cases, a constraint may be placed on the scheduling of time-critical messages. This constraint limits the maximum number of packets that can be served per message identifier in transmission queue buffer 226 during a selected time interval. This constraint may be referred to as a maximum frame constraint. When this limit is exceeded, an error occurs and the message corresponding to the message identifier is truncated. In this manner, no single message can cause an undesired delay in the scheduling of the next message. Thus, the timing of serving each message identifier in transmission queue buffer 226 is predictable and assured.

Once scheduler 216 identifies an available instance of a message to schedule, scheduler 216 packetizes at least a portion of the message based on a selected packet size. For example, if the selected packet size is 100 bytes, a 100-byte size block of data is extracted from the message and converted into a packet for transmission.

As part of the scheduling of messages, scheduler 216 places this packet in packet buffer 228. Packet buffer 228 may have two different queues. For example, one portion of packet buffer 228 may be used as low priority queue 268 and another portion of packet buffer 228 may be used as high priority queue 270. Scheduler 216 places packets of time-critical messages in high priority queue 270 and packets of general messages in low priority queue 268.

Transmission controller 218 controls the actual transmission of packetized messages. In particular, transmission controller 218 controls the sending of packets along plurality of virtual links 204.

Transmission controller 218 prioritizes time-critical messages over general messages. In particular, transmission controller 218 prioritizes the transmission of packets in high priority queue 270 of packet buffer 228 over the packets in low priority queue 268 of packet buffer 228.

The illustrations of network 100 in FIG. 1 and scheduling system 130 in FIGS. 1-2 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In other illustrative examples, scheduling system 130 may include one or more other tables in addition to or in place of one or more of the tables shown in FIG. 2. Similarly, in some cases, scheduling system 130 may include one or more other buffers in addition to or in place of one or more of the buffers shown in FIG. 2. In some illustrative examples, scheduler 216 may use some other type of policy other than idle policy 264 and immediate policy 266 to control the behavior of the time-critical scheduling process.

Figure 3:
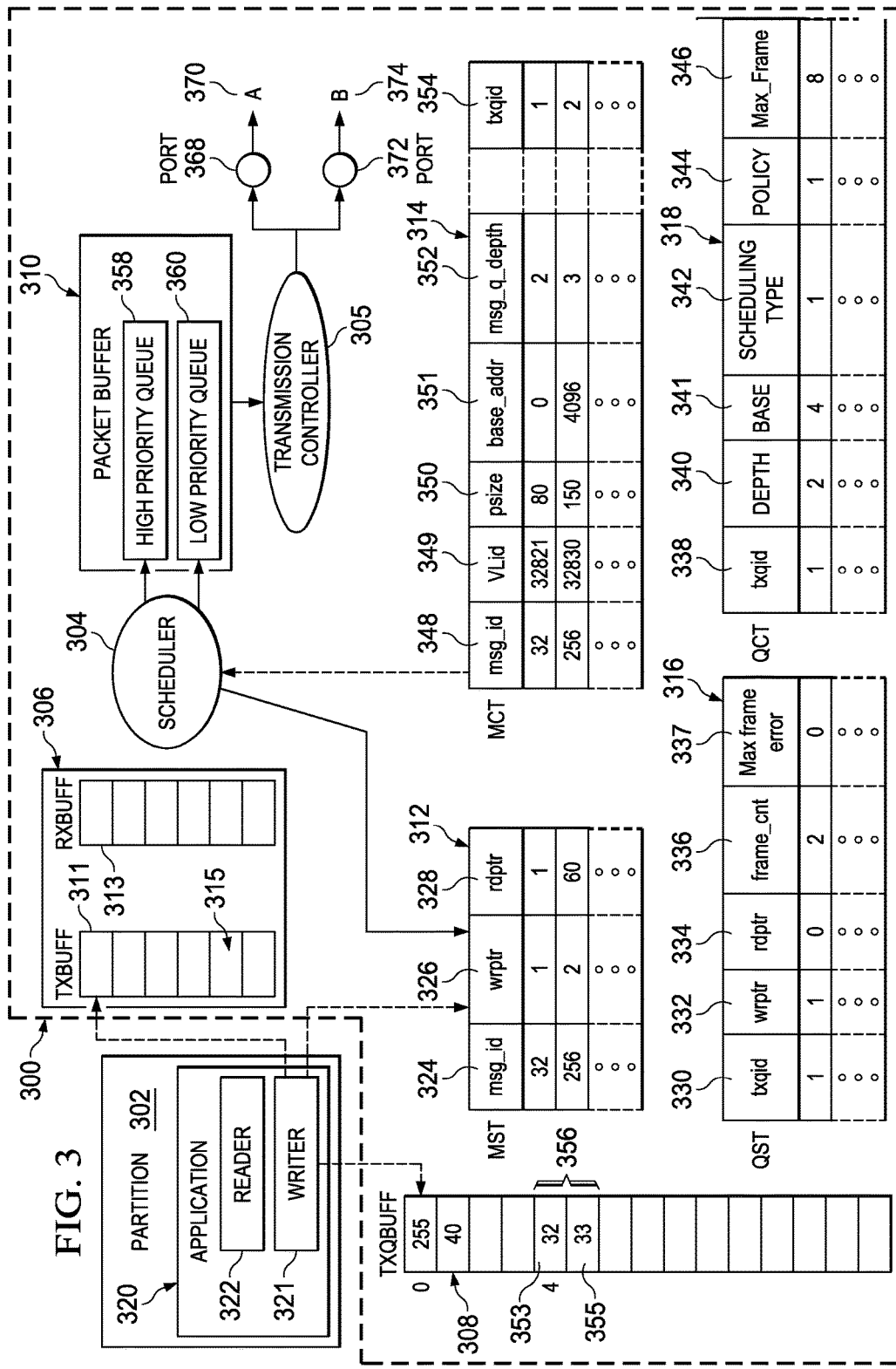
FIG. 3 is an illustration of a diagrammatic representation of a partition and a scheduling system in accordance with an illustrative embodiment.

With reference now to FIG. 3, an illustration of a diagrammatic representation of a partition and a scheduling system is depicted in accordance with an illustrative embodiment. In this illustrative example, scheduling system 300 and partition 302 may be examples of implementations for scheduling system 130 and partition 114, respectively, in FIG. 1.

Scheduling system 300 includes scheduler 304, and transmission controller 305. Scheduler 304 and transmission controller 305 may be examples of implementations for scheduler 216 and transmission controller 218, respectively, in FIG. 2.

As depicted, scheduling system 300 also includes buffers and tables. In particular, scheduling system 300 includes message buffers 306, transmission queue buffer 308, and packet buffer 310. Message buffers 306, transmission queue buffer 308, and packet buffer 310 may be examples of implementations for plurality of message buffers 224, transmission queue buffer 226, and packet buffer 228, respectively, in FIG. 2.

Message buffers 306 may be physical memory buffers associated with logical ports for storing messages that are to be transmitted and messages that are received. Transmit message buffer 311 is an example of one of message buffers 306 used for storing messages that are to be transmitted. Transmit message buffer 311 is an example of one implementation for message buffer 232 in FIG. 2. Receive message buffer 313 is an example of one of message buffers 306 used for storing messages that are received.

Transmit message buffer 311 includes plurality of message buffer sections 315, which may be an example of one implementation for plurality of message buffer sections 233 in FIG. 2. Each message buffer section of plurality of message buffer sections 315 may be referenced using a unique message identifier, msg_id. Further, each message buffer section may include one or more entries that have the same message identifier.

Scheduling system 300 also includes message status table 312, message configuration table 314, queue status table 316, and queue configuration table 318. Message status table 312, message configuration table 314, queue status table 316, and queue configuration table 318 may be examples of implementations for message status table 248, message configuration table 242, queue status table 250, and queue configuration table 244, respectively, in FIG. 2.

Message status table 312 and queue status table 316 are dynamic tables. In other words, these tables may be updatable. Message configuration table 314 and queue configuration table 318 are static tables that are fixed.

In this illustrative example, partition 302 comprises an allocated portion of a processor and a memory of an end system, such as end system 104 in FIG. 1. Partition 302 may be one of multiple partitions, each of which is designated for running a single application. In this illustrative example, partition 302 is designated for running application 320.

Application 320 may have a defined run schedule, such as defined run schedule 116 in FIG. 1. This defined run schedule is independent of other applications that run on other partitions of the end system. The defined run schedule may include, for example, a frequency and a duration.

As depicted, application 320 includes writer 321 and reader 322. Writer 321 of application 320 writes messages to transmit message buffer 311. As one illustrative example, writer 321 may write a message into a particular entry within a particular message buffer section of transmit message buffer 311. Writer 321 and scheduler 304 use message status table 312, message configuration table 314, queue status table 316, and queue configuration table 318 to schedule the messages held within transmit message buffer 311.

As depicted, message status table 312 may include, but is not limited to, message identifier column 324, write pointer column 326, and read pointer column 328. Further, queue status table 316 includes, but is not limited to, queue identifier column 330, write pointer column 332, read pointer column 334, frame count column 336, and max frame error column 337.

Queue configuration table 318 includes, but is not limited to, queue identifier column 338, depth column 340, base column 341, scheduling type column 342, policy column 344, and max frame column 346. In this illustrative example, message configuration table 314 includes message identifier column 348, virtual link identifier column 349, packet size column 350, base address column 351, message queue depth column 352, and queue identifier column 354.

Message configuration table 314 is indexed by message identifier column 348. Message status table 312 is indexed by message identifier column 324. Both message identifier column 348 of message configuration table 314 and message identifier column 324 of message status table 312 include the same message identifiers.

Message identifier column 324 and message identifier column 348 may each include all possible message identifiers that correspond to all of the message buffer sections in plurality of message buffer sections 315 in transmit message buffer 311. In other words, each entry of message identifier column 324 includes a message identifier that references a particular message buffer section of plurality of message buffer sections 315. Further, each entry of message identifier column 348 includes a message identifier that references a particular message buffer section of plurality of message buffer sections 315.

Further, queue status table 316 is indexed by queue identifier column 330. Queue configuration table 318 is indexed by queue identifier column 338. Both queue identifier column 330 of queue status table 316 and queue identifier column 338 of queue configuration table 318 include the same queue identifiers. Each queue identifier corresponds to a virtual link or a sub-link in a virtual link, and thereby, references a particular section or portion of transmission queue buffer 308.

When application 320 generates a message having a corresponding message identifier, writer 321 uses the message identifier as an index for message configuration table 314 to look up the message buffer section in transmit message buffer 311 in which the message is to be written. In particular, writer 321 uses the corresponding base address in base address column 351 to identify a message buffer section in transmit message buffer 311.

Writer 321 then uses the message identifier as an index to look up the value of the corresponding write pointer in write pointer column 326 of message status table 312. The value of this write pointer indicates into which entry within the message buffer section that the message is to be written. Writer 321 writes the message into this entry and updates message status table 312 by updating the write pointer in write pointer column 326. In one illustrative example, this updating is performed by incrementing the write pointer by one.

Write pointer column 326 includes write pointers for each of the message identifiers included in message identifier column 324. The write pointer corresponding to a particular message identifier is used to track the number of instances of messages that are written to a message buffer section that is referenced by that particular message identifier.

The write pointer in write pointer column 326 corresponding to a particular message identifier may be updated by incrementing the write pointer by one up until a message queue depth is reached. This message queue depth is determined by the message queue depth in message queue depth column 352 that corresponds to the same particular message identifier. For example, when the queue depth is 3, the write pointer may have a range of 0 to 2. Incrementing a write pointer having a value of 2 means wrapping back around at 0 in this example.

If the message written to transmit message buffer 311 is a general message, then writer 321 also inserts the corresponding general message identifier into transmission queue buffer 308. However, this step is not needed if the message is a time-critical message.

Whether a message is a general message or a time-critical message is indicated by the scheduling type column 342 in queue configuration table 318. For example, writer 321 uses the message identifier of the message to look up a queue identifier, txqid, in queue identifier column 354 in message configuration table 314. More specifically, writer 321 uses the message identifier in message identifier column 348 of message configuration table 314 as an index to look up the corresponding queue identifier in queue identifier column 354 of message configuration table 314.

Next, writer 321 uses this queue identifier as an index to look up a corresponding scheduling type in scheduling type column 342 in queue configuration table 318. As previously described, the scheduling type may be a time-critical scheduling type or a general scheduling type. For example, the scheduling type may be identified as a "1" or "0" in queue configuration table 318. A "1" indicates a time-critical scheduling type, while a "0" indicates a general message scheduling type.

When the scheduling type is a general scheduling type, writer 321 inserts the message identifier for the message into a position, or slot, of transmission queue buffer 308. This position, or slot, may be defined as follows:

POS=base+wrtpter, where POS is the position in transmission queue buffer 308 at which the message identifier is to be added; base is the base address in base column 341 of queue configuration table 318 that corresponds to the queue identifier for the message; and wrtpter is the write pointer in write pointer column 332 of queue status table 316 that corresponds to the queue identifier for the message.

Once writer 321 inserts the message identifier into the correct position in transmission queue buffer 308, writer 321 then updates the write pointer in write pointer column 332 of queue status table 316. For example, without limitation, writer 321 may increment the write pointer in write pointer column 332 by one. In particular, the value of the write pointer is incremented until reaching the corresponding depth of the queue, as identified in depth column 340 of queue configuration table 318. For example, if the depth corresponding to a particular queue identifier is 2, then the write pointer may have a range of 0 to 1. Incrementing the write pointer when the write pointer currently has a value of 1 causes the write pointer to wrap back around to 0. This completes the availability update process performed by writer 321 for the message when the scheduling type is identified as a general scheduling type.

However, when the scheduling type identified in scheduling type column 342 of queue configuration table 318 is a time-critical scheduling type, writer 321 does not need to insert the message identifier associated with the message into transmission queue buffer 308 because the corresponding section of transmission queue buffer 308 is preconfigured. In other words, the time-critical message identifier does not need to be added to transmission queue buffer 308. Further, in this example, the write pointer in write pointer column 332 of queue status table 316 does not need to be updated.

In these illustrative examples, time-critical message identifiers do not need to be added to transmission queue buffer 308 because at least one section of transmission queue buffer 308 is prefilled with time-critical message identifiers in a predetermined order. In this manner, transmission queue buffer 308 may be considered statically preconfigured with respect to time-critical messages.

As one illustrative example, position 353 and position 355 of transmission queue buffer 308 have been prefilled with time-critical message identifiers. Position 353 and position 355 form preconfigured section 356 of transmission queue buffer 308. Preconfigured section 356 of transmission queue buffer 308 is an example of one implementation for preconfigured section 260 of transmission queue buffer 226 in FIG. 2. The time-critical message identifiers included in preconfigured section 356 are fixed and are not updatable in this illustrative example.

For a particular queue identifier in queue identifier column 338 of queue configuration table 318, queue configuration table 318 identifies the particular positions in transmission queue buffer 308 at which sections begin in transmission queue buffer 308. As one illustrative example, for a particular queue identifier entry in queue configuration table 318, base column 341 identifies a base address that indicates where the section in transmission queue buffer 308 referenced by the corresponding queue identifier. Further, the corresponding value in depth column 340 identifies the number of positions, or slots, in transmission queue buffer 308 designated for this section of transmission queue buffer 308.

Scheduler 304 performs scheduling concurrently with the operations performed by partition 114 and, in particular, writer 321. Scheduler 304 performs the scheduling of messages that are held within transmit message buffer 311.

When a virtual link has been determined to be eligible and a new instance of a message for the corresponding message identifier is available, scheduler 304 uses the message identifier to retrieve the corresponding read pointer in read pointer column 328 of message status table 312 and the corresponding base address in base address column 351 of message configuration table 314. Scheduler 304 then uses the retrieved read pointer and base address to read the message from transmit message buffer 311.

Scheduler 304 packetizes at least a portion of the message to form a packet for transmission. Scheduler 304 also updates the read pointer in read pointer column 328 of message status table 312 once the message has been fully packetized.

Read pointer column 328 includes read pointers for each of the message identifiers included in message identifier column 324. The read pointer corresponding to a particular message identifier is used to track the particular instances of messages that have been scheduled by scheduler 304. For example, when scheduler 304 completes the scheduling of a particular message referenced by a message identifier, the read pointer in read pointer column 328 of message status table 312 that corresponds to this message identifier may be updated. For example, the read pointer may be incremented by one.

After forming a packet, scheduler 304 adds the packet to packet buffer 310. In this illustrative example, packet buffer 310 includes high priority queue 358 and low priority queue 360. High priority queue 358 and low priority queue 368 are examples of implementations for high priority queue 270 and low priority queue 268, respectively in FIG. 2.

High priority queue 358 holds packets of time-critical messages. Low priority queue 360 holds packets of general messages. Scheduler 304 places a packet in either high priority queue 358 or low priority queue 360 based on the scheduling type defined in scheduling type column 342 of queue configuration table 318.

Transmission controller 305 operates concurrently with scheduler 304. Transmission controller 305 retrieves packets from packet buffer 310 and transmits these packets, giving priority to time-critical messages. In one illustrative example, transmission controller 305 serves the packets of time-critical messages in high priority queue 358 before serving low priority queue 360. For example, transmission controller 305 may serve the packets of general messages in low priority queue 360 only when high priority queue 358 is empty.

If new packets are added to high priority queue 358 while transmission controller 305 is serving low priority queue 360, transmission controller 305 will finish transmission of the current packet in low priority queue 360 and then switch to serving high priority queue 358. In this manner, high priority queue 358 may only be delayed by at most one packet. This type of prioritization of high priority queue 358 ensures the prioritized transmission of packetized time-critical messages.

Figure 4:
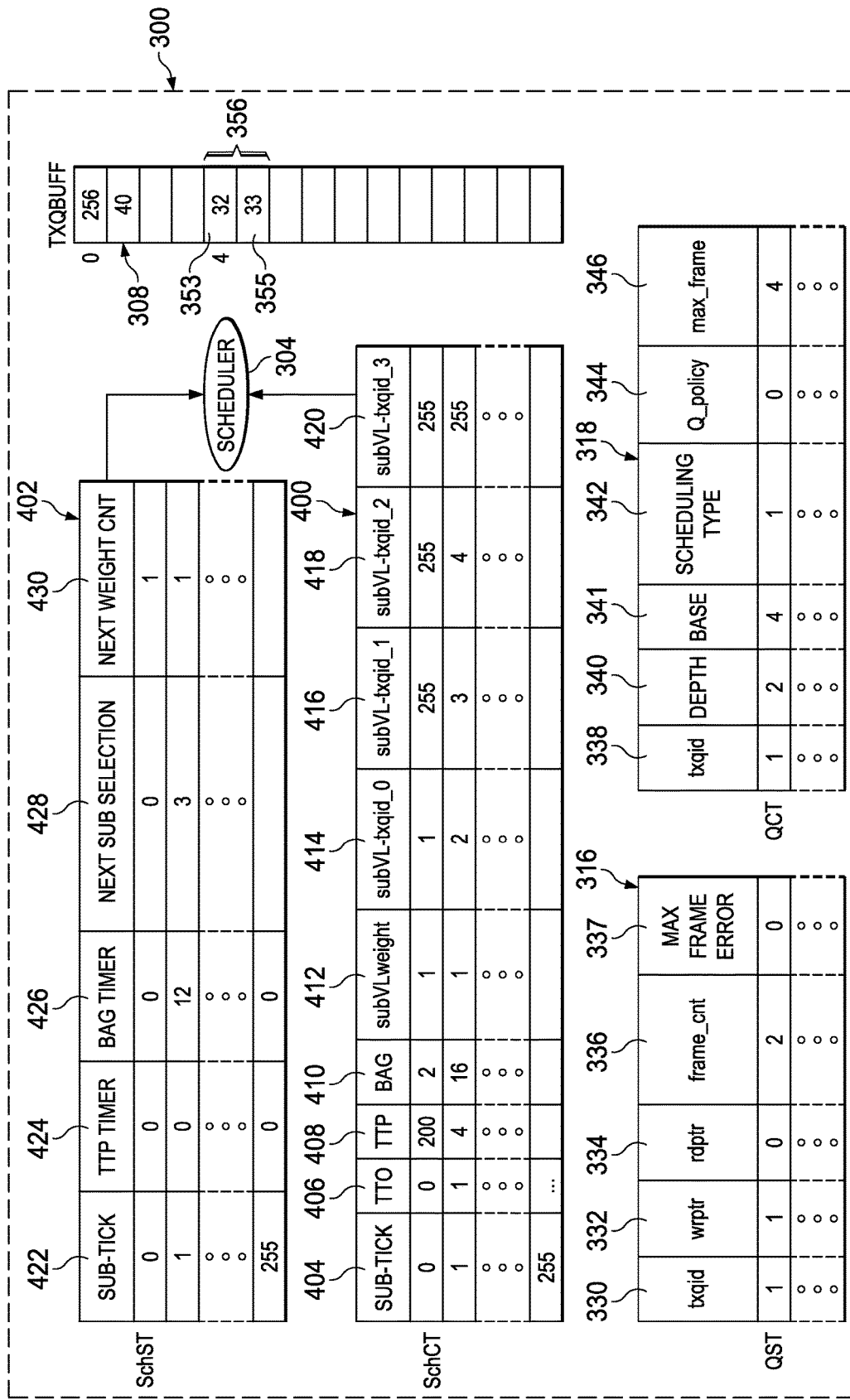
FIG. 4 is an illustration of a diagrammatic representation of a scheduling system in accordance with an illustrative embodiment.

With reference now to FIG. 4, an illustration of a diagrammatic representation of scheduling system 300 from FIG. 3 is depicted in accordance with an illustrative embodiment. As depicted in FIG. 4, in addition to scheduler 304, transmission queue buffer 308, queue status table 316, and queue configuration table 318 from FIG. 3, scheduling system 300 also includes schedule configuration table 400 and schedule status table 402.

Schedule configuration table 400 and schedule status table 402 may be examples of implementations for schedule configuration table 246 and schedule status table 252, respectively, in FIG. 2. Schedule configuration table 400 and schedule status table 402 form a set of unified schedule tables.

Scheduler 304 uses schedule configuration table 400 and schedule status table 402 to manage the scheduling of messages for which message identifiers have been added to transmission queue buffer 308. As previously described, transmission queue buffer 308 contains the message identifiers referencing messages in message buffers 306 in FIG. 3 that are waiting to be schedule.

In this illustrative example, schedule configuration table 400 has 256 entries, which are not all shown in FIG. 4. Scheduler 304 processes each entry in schedule configuration table 400 in a single unit of time, which may be referred to as a time slice, θ.

As described previously, the major frame for an end system may be the minimum period of time during which all partitions have run their corresponding applications at least once and after which the run pattern for these partitions repeats. In this illustrative example, a time-critical message may be published by an application partition right before the end of the run of the application partition.

As one illustrative example, the major frame for a set of partitions may be about 100 milliseconds. A time-critical message published by a partition of this set of partitions may be ready for scheduling for transmission at about 95 milliseconds after the start of a major frame cycle. All time-critical messages may have fixed, static times of readiness for scheduling relative to the start of the major frame cycle.

In this illustrative example, the major frame for the set of applications that includes partition 302 in FIG. 3 is about 200 milliseconds. In other words, one major frame cycle may take about 200 milliseconds. This major frame cycle may be divided into 1024 discrete ticks. Thus, each tick may be about 195 microseconds (µs). Each tick may then be divided into 256 discrete sub-ticks. Thus, each sub-tick may be about 0.76 microseconds. Each sub-tick may be considered a time slice, θ.

Scheduler 304 is configured to process the entirety of schedule configuration table 400 in the time of one tick. Further, scheduler 304 is configured to process, or serve, each entry in schedule configuration table 400 in the time of one sub-tick. With scheduler 304 configured to serve the entire schedule configuration table 400 about 1024 times in a single major frame of 200 milliseconds, scheduler 304 may process each entry of schedule configuration table 400 in about 0.76 microseconds and the entirety of schedule configuration table 400 in about 195 microseconds.

Schedule configuration table 400 is a static table. Schedule configuration table 400 defines the order for processing a mix of time-critical messages and general messages.

As previously described, a virtual link is a logical data flow from a single source end system to one or more destination end systems. Any number of time-critical messages and general messages may be transmitted along a virtual link. However, in some cases, a virtual link may be reserved only for time-critical messages that are time-sensitive and small in size.

In some illustrative examples, a virtual link may be subdivided into a plurality of sub-links. Each of these sub-links may be designated for either time-critical messages or general messages. In these examples, queue identifiers identified in, for example, without limitation, queue identifier column 330 of queue status table 316 and queue identifier column 338 of queue configuration table 318 may correspond to sub-links of virtual links rather than an entire virtual link.

As depicted, schedule configuration table 400 includes sub-tick column 404, transmit table offset (TTO) column 406, transmit table period (TTP) column 408, bandwidth allocation gap (BAG) column 410, sub-link weight column 412, first sub-link queue identifier column 414, second sub-link queue identifier column 416, and third sub-link queue identifier column 418.

Schedule configuration table 400 is indexed by sub-tick column 404. In this illustrative example, sub-tick column 404 includes an entry for each of the 256 sub-ticks that make up each of the 1024 ticks that occur during a major frame cycle.

Each entry in schedule configuration table 400 defines one virtual link with predefined values for the attributes identified in schedule configuration table 400. These predefined values are dependent on whether the virtual link is of a time-critical scheduling type or a general scheduling type. The corresponding transmit table offset (TTO) in transmit table offset column 406 defines the offset in time for the beginning of the corresponding transmit table period.

When a sub-tick in sub-tick column 404 of schedule configuration table 400 corresponds to a virtual link of a time-critical scheduling type, the corresponding transmit table period is the period after which the message arrival pattern for the time-critical messages repeats. The corresponding transmit table period (TTP) in transmit table period column 408 may be aligned with the major frame cycle and not directly related to the bandwidth allocation gap associated with the virtual link. As one illustrative example, when the major frame is 200 milliseconds and the bandwidth allocation gap is 2 milliseconds, the transmit table period for a particular virtual link may be equal to the period of the major frame. In some cases, the transmit table period may be a fraction of the period of the major frame.

However, when a sub-tick in sub-tick column 404 of schedule configuration table 400 corresponds to a virtual link of a general scheduling type, the corresponding transmit table period in transmit table period column 408 may be considered a sampling rate. The transmit table period determines the time period during which scheduler 304 will serve the corresponding general message. In other words, the transmit table period may determine how frequently scheduler 304 checks whether a new instance of a message is eligible for transmission. For example, the transmit table period may be a divisor of the bandwidth allocation gap. As one illustrative example, if the bandwidth allocation gap is 16 milliseconds, the transmit table period may be 4 milliseconds, 8 milliseconds, or 2 milliseconds.

Bandwidth allocation gap column 410 identifies the bandwidth allocation gap associated with the virtual link corresponding to each sub-tick identified in sub-tick column 404. Sub-link weight column 412 identifies the weight as a number, p, of packets that may be scheduled at a time in a particular sub-link. The number, p, of packets that may be scheduled may be greater than or equal to one. But, typically, the number, p, of packets that may be scheduled at a time in a particular sub-link is one.

First sub-link queue identifier column 414, second sub-link queue identifier column 416, third sub-link queue identifier column 418, and fourth sub-link queue identifier column 420 identify the queue identifiers for up to four sub-links. Although not shown in this illustrative example, schedule configuration table 400 may include one or more other sub-link queue identifier columns, depending on the implementation. In one illustrative example, schedule configuration table 400 may include as many sub-link queue identifier columns as there are queue identifiers.

Whether a particular virtual link is of a time-critical scheduling type or a general scheduling type is defined in queue configuration table 318. In particular, scheduling type column 342 identifies whether a particular virtual link is of a time-critical scheduling type or a general scheduling type. In one illustrative example, with the queue identifiers in queue configuration table 318 referencing sub-links, scheduling type column 342 identifies whether the corresponding sub-link is of a time-critical scheduling type or a general scheduling type.

Policy column 344 applies only to virtual links, or sub-links, of the time-critical scheduling type and identifies the particular policy to be used. As one illustrative example, time-critical scheduling may be performed according to either an idle policy, such as idle policy 264 in FIG. 2, or an immediate policy, such as immediate policy 266 in FIG. 2.

Policy column 344 of queue configuration table 318 defines which policy to use. For example, a value of "0" in policy column 344 may identify the idle policy, while a value of "1" in policy column 344 may identify the immediate policy.

The idle policy requires that scheduling strictly follow the order of message identifiers in transmission queue buffer 308 and an allocated total time requirement for each position of transmission queue buffer 308. This allocated total time requirement may be the amount of time allocated for scheduler 304 to process the message referenced by each position and may be based on the corresponding max frame value in max frame column 346 of queue configuration table 318.

The maximum frame value may be a constraint on the maximum number of packets that can be served per message identifier during a transmit table period. Exceeding this maximum frame value during a transmit table period may result in an error and truncation of the message. The maximum frame value ensures that no single message will delay scheduling of the next message referenced by the next message identifier in transmission queue buffer 308. In this manner, the timing for serving each message identifier included in transmission queue buffer 308 may be predictable and assured.

In one illustrative example, for a current position in transmission queue buffer 308, if the message referenced by the message identifier is not available, scheduler 304 does not move forward to the next position in transmission queue buffer 308 until the amount of time that is equivalent to scheduling a number of packets equal to the maximum frame value in max frame column 346 has passed. This amount of time may be defined as the product of the bandwidth allocation gap identified in bandwidth allocation gap column 410 of schedule configuration table 400 and the maximum frame value identified in max frame column 346 of queue configuration table 318. This waiting period ensures that subsequent messages are not transmitted prematurely.

The immediate policy also requires that scheduling strictly follow the order of message identifiers in transmission queue buffer 308 but allows scheduler 304 to skip the current position in transmission queue buffer 308 if the corresponding message is not available. Scheduler 304 may then immediately move forward to the next position in transmission queue buffer 308.

A message is considered available for scheduling when a new instance of a message is present in transmit message buffer 311 in FIG. 3. For example, a message may be available when the corresponding read pointer in read pointer column 328 of message status table 312 in FIG. 3 is not the same as the corresponding write pointer in write pointer column 326 of message status table 312.

Scheduling of a message requires that both the message be available and the corresponding virtual link be eligible. The eligibility of the virtual link may be determined using schedule status table 402.

Schedule status table 402 is a dynamic table. Schedule status table 402 includes sub-tick column 422, transmit table period timer column 424, bandwidth allocation gap timer column 426, next sub-link selection column 428, and next weight count column 430. Schedule status table 402 is indexed by sub-tick column 422.

Each of transmit table period timer column 424 and bandwidth allocation gap timer column 426 include a timer for each sub-tick identified in sub-tick column 422. As described previously, each sub-tick in sub-tick column 422 corresponds to a virtual link.

A virtual link is considered eligible when both timers for transmit table period and bandwidth allocation gap have expired. In other words, a virtual link is eligible when both the corresponding transmit table period timer value in transmit table period timer column 424 and the corresponding bandwidth allocation gap timer in bandwidth allocation gap timer column 426 are zero.

The transmit table period timer value in transmit table period timer column 424 may also be referred to as a transmit table period time to mature. Thus, the transmit table period timer value counts down to the time at which the transmit table period expires. Similarly, the bandwidth allocation gap timer value in bandwidth allocation gap timer column 426 may also be referred to as a bandwidth allocation gap time to mature. Thus, the bandwidth allocation gap timer value counts down to the time at which the bandwidth allocation gap time interval expires.

When a particular message is available and the corresponding virtual link is eligible, the available message may be served by the number, p, of packets per bandwidth allocation gap time interval. Typically, the available message is served one packet per bandwidth allocation gap time interval.

In this manner, using schedule configuration table 400 and schedule status table 402 enables scheduler 304 to integrate the scheduling of time-critical messages and general messages. In particular, because transmission queue buffer 308 is statically preconfigured with respect to time-critical message identifiers and schedule configuration table 400 is static, the scheduling of time-critical messages may be performed predictably and deterministically.

As one illustrative example, scheduler 304 may serve one sub-tick of schedule configuration table 400. Scheduler 304 uses the sub-tick to also determine whether the transmit table period timer and the bandwidth allocation gap timer have both expired. If either of these timers has not expired, the value of that timer is decremented by one.

If both of these timers have expired, scheduler 304 uses the value of the next sub-link selection in next sub-link selection column 428 to determine which sub-link column to serve. This sub-link column may be selected from one of first sub-link queue identifier column 414, second sub-link queue identifier column 416, third sub-link queue identifier column 418, and fourth sub-link queue identifier column 420.

Once scheduler 304 identifies the appropriate sub-link column, scheduler 304 identifies the corresponding queue identifier in the appropriate sub-link column. Scheduler 304 then increments the value of the next sub-link selection in next sub-link selection column 428, wrapping around when necessary. Scheduler 304 uses next weight count column 430 to track how many packets are served per sub-link before moving on to the next sub-link.

Using the queue identifier, scheduler 304 determines whether the corresponding value in the max frame error column 337 indicates that the maximum number of packets that can be transmitted for a particular message has been reached. If the error is set in max frame error column 337, maximum number of packets has been reached. Scheduler 304 resets the value in frame count column 336 to zero and clears or changes the value in max frame error column 337. Scheduler 304 then increments the read pointer in read pointer column 328 in FIG. 3 by one, which effectively skips serving this message and scheduler 304 waits to serve the next sub-tick.

If, however, the value in max frame error column 337 indicates that the maximum number of packets has not been reached, scheduler 304 uses the queue identifier to look up a position in transmission queue buffer 308 using queue configuration table 318. This position contains a message identifier for the message to be read. Scheduler 304 then uses the message identifier to look up a base address in base address column 351 in message configuration table 314 in FIG. 3 and to look up a read pointer in read pointer column 328 of message status table 312 in FIG. 3.

With this base address and read pointer, scheduler 304 accesses the corresponding message in the corresponding entry in transmit message buffer 311 in FIG. 3. Scheduler 304 then extracts a portion of data from the message having a size equal to the corresponding packet size in packet size column 350 in message configuration table 314 in FIG. 3. Scheduler 304 forms a packet using this portion of data and places the packet into packet buffer 310 in FIG. 3.

Scheduler 304 then updates the corresponding value in frame count column 336 by incrementing by one. A determination is then made as to whether the frame count value equals the corresponding maximum frame value in max frame column 346 in queue configuration table 318.

If the two values are equal, scheduler 304 changes the corresponding value in max frame error column 337 to reflect that the maximum number of packets for the particular message have been scheduled. Scheduler 304 then skips serving this message by the mechanism described earlier and waits to serve the next sub-tick. Scheduler 304 also increments the read pointer in read pointer column 328 in FIG. 3 by one, with the read pointer wrapping around when the value of the read pointer reaches the value of the message queue depth in message queue depth column 352 of message configuration table 314 in FIG. 3. If, the frame count value and the maximum frame value are not equal, scheduler 304 simply increments the read pointer in read pointer column 328 in FIG. 3 by one.

Figure 5:
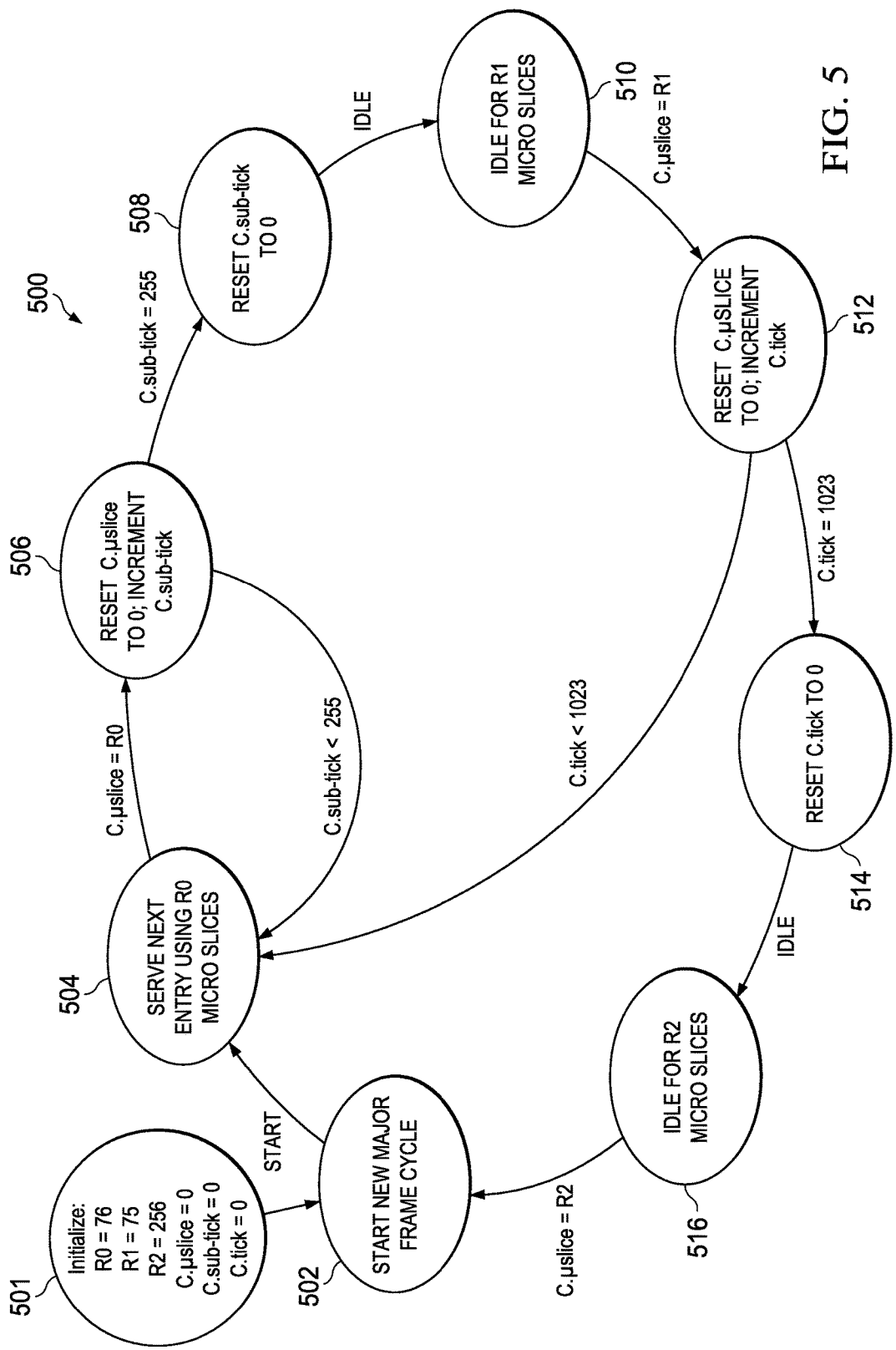
FIG. 5 is an illustration of a state diagram that identifies the logic used by a scheduler to serve each entry in a schedule configuration table in accordance with an illustrative embodiment.

With reference now to FIG. 5, an illustration of a state diagram that identifies the logic used by scheduler 304 from FIGS. 3-4 to serve each entry in schedule configuration table 400 from FIG. 4 is depicted in accordance with an illustrative embodiment. In this illustrative example, state diagram 500 includes initialization state 501.

When scheduler 304 is in initialization state 501, scheduler 304 initializes a set of counters and a set of registers. The set of registers includes a service time register, a remainder time per tick register, and a remainder time per major frame register.

In one illustrative example, where the major frame is about 200 milliseconds, schedule configuration table 400 from FIG. 4 is known to have 256 entries, and 1024 ticks are completed per major frame cycle, these registers may be initialized as follows:

R0=76,
R1=75, and
R2=256, where R0 is the service time register, R1 is the remainder time per tick register, and R2 is the remainder time per major frame register.

In this illustrative example, scheduler 304 is configured to serve 1024 rounds of schedule configuration table 400 within the major frame of about 200 milliseconds. Each of the 1024 rounds may also be referred to as a tick. A micro slice unit, $\tau$, may be the smallest unit of processor time that can be scheduled to process a task. In this illustrative example, the micro slice unit, $\tau$, may be set to about 10 nanoseconds (ns).

To determine the total number of micro slices that need to be scheduled per major frame cycle, the major frame of 200 milliseconds is divided by the product of 1024 ticks and 10 nanoseconds. For example, $$\text{\#µslice}=(MF)/(\tau*\text{\#ticks})$$

where #µslice is the total number of micro slices that are needed, MF is the major frame, $\tau$ is the unit of micro slice, and #ticks is the total number of ticks completed within a major frame.

When the major frame, MF, is 200,000,000 nanoseconds, $\tau$ is 10 nanoseconds, and #ticks is 1024, then #µslice is about 19531 micro slices. The service time, $\theta$, needed for each of the 256 entries in schedule configuration table 400 in FIG. 4 then is computed as follows:

$$\theta=19531/256\approx76 \text{ micro slices}\approx760 \text{ nanoseconds.}$$

In other words, the service time for each entry of schedule configuration table 400 in FIG. 4 may be about 76 micro slices, which may be about 760 nanoseconds given that micro slice unit, τ, is set to about 10 nanoseconds. The service time register R0 is set to count the micro slices per service time for each entry. In this manner, R0 may be initialized to 76.

However, if each entry of schedule configuration table 400 in FIG. 4 is served over 76 micro slices, then the total amount of time needed to serve all of the entries of schedule configuration table 400 may be computed as follows:

$$\omega = 256 * 76 = 19456 \text{ micro slices,}$$

where ω is the total service time needed to serve all of the entries of schedule configuration table 400. Because ω is less than #μslice, the remainder time per round of processing of the entire schedule configuration table 400 from FIG. 4 during the major frame cycle may need to be taken into account. This remainder time per round may be computed as follows:

$$rem.p.r = \#\mu slice - \omega = 19531 - 19456 = 75,$$

where rem.p.r is the remainder time per round. This remainder is used to initialize the remainder time per round register, R1, to 75.

Further, within a major frame, a remainder time may be present after the 1024 rounds of processing schedule configuration table 400 from FIG. 4. For example, $$rem \cdot p \cdot MF = (MF/\tau) - (1024 * \#\mu slice)$$
$$= 20{,}000{,}000 \text{ ns} - (1024 * 19531)$$
$$= 256 \text{ micro slices,}$$

where rem.p.MF is the remainder time per major frame after 1024 rounds of serving the entire schedule configuration table 400 from FIG. 4. Thus, the remainder time per major frame register, R2, may be initialized to 256.

The set of counters that are initialized by scheduler 304 from FIGS. 3-4 include a micro slice counter, a sub-tick counter, and a tick counter. These counters may be initialized to zero as follows:

C.μslice=0,
C.sub-tick=0, and
C.tick=0, where C.μslice is the micro slice counter, C.sub-tick is the sub-tick counter, and C.tick is the tick counter.

The C.tick counter counts from 0 to 1023 to keep track of each of the 1024 rounds of processing of schedule configuration table 400 from FIG. 4. The C.sub-tick counter counts from 0 to 255 to keep track of each of the 256 entries of schedule configuration table 400. Further, the C.μslice counter counts from 0 to 75 to keep track of the 76 micro slices of service time per entry of schedule configuration table 400.

After initialization state 501, scheduler 304 enters new major frame state 502, where scheduler 304 begins a new major frame cycle. Scheduler 304 then enters serve state 504. In serve state 504, scheduler 304 serves the next entry in schedule configuration table 400 over the course of the service time in micro slices allotted for the entry, as defined by the service time register, R0. The micro slice counter, C.μslice keeps track of each micro slice during the serving of the current entry during serve state 504.

After R0 micro slices have been completed, scheduler 304 enters update state 506, where scheduler 304 resets the micro slice counter, C.μslice, to zero and increments the sub-tick counter, C.sub-tick, by one. A determination is made as to whether the sub-tick counter has reached 255. If the sub-tick counter has not reached 255, scheduler 304 returns to serve state 504. If the sub-tick counter has reached 255, scheduler 304 proceeds to reset state 508.

In this manner, scheduler 304 cycles through serve state 504 and update state 506 repeatedly until the sub-tick counter, C.sub-tick, reaches 255. When the sub-tick counter reaches 255, one round of processing of schedule configuration table 400 from FIG. 4 has been completed.

Upon entering reset state 508, scheduler 304 resets the sub-tick counter to zero. Scheduler 304 then enters idle state 510 and idles for the remainder time in micro slices for this round of processing, as defined by the remainder time per round register, R1. For example, scheduler 304 may idle for 75 microslices in idle state 510, with the micro slice counter, C.μslice, keeping track of each micro slice.

When the micro slice counter, C.μslice, has reached the value of R1, scheduler 304 proceeds to update state 512. In update state 512, scheduler 304 resets the micro slice counter, C.μslice, to zero and increments the tick counter, C.tick, by one. If the tick counter has not reached 1023, then scheduler 304 returns to serve state 504 described above. If, however, the tick counter has reached 1023, then the 1024 rounds of processing of schedule configuration table 400 have been completed and scheduler 304 proceeds to reset state 514.

In reset state 514, scheduler 304 resets the tick counter, C.tick, to zero. Scheduler 304 then enters idle state 516 and idles for the remainder time in micro slices for the major frame cycle, as defined by the remainder time per major frame register, R2. For example, scheduler 304 may idle for 256 micro slices, with the micro slice counter, C.μslice, keeping track of each micro slice. When the micro slice counter, C.μslice, reaches the value of R2, scheduler proceeds to new major frame state 502 described above.

The illustrations of scheduling system 300 in FIGS. 3-4 are not meant to imply physical or architectural limitations to the manner in which an illustrative embodiment may be implemented. Other items in addition to or in place of the ones illustrated may be used. Some items may be optional. Also, the blocks are presented to illustrate some functional components. One or more of these blocks may be combined, divided, or combined and divided into different blocks when implemented in an illustrative embodiment.

In other illustrative examples, message configuration table 314, queue configuration table 318, or both may include other columns not shown in FIG. 3. In some cases, high priority queue 358 may be divided into multiple queues of varying levels of high priority.

Figure 6:
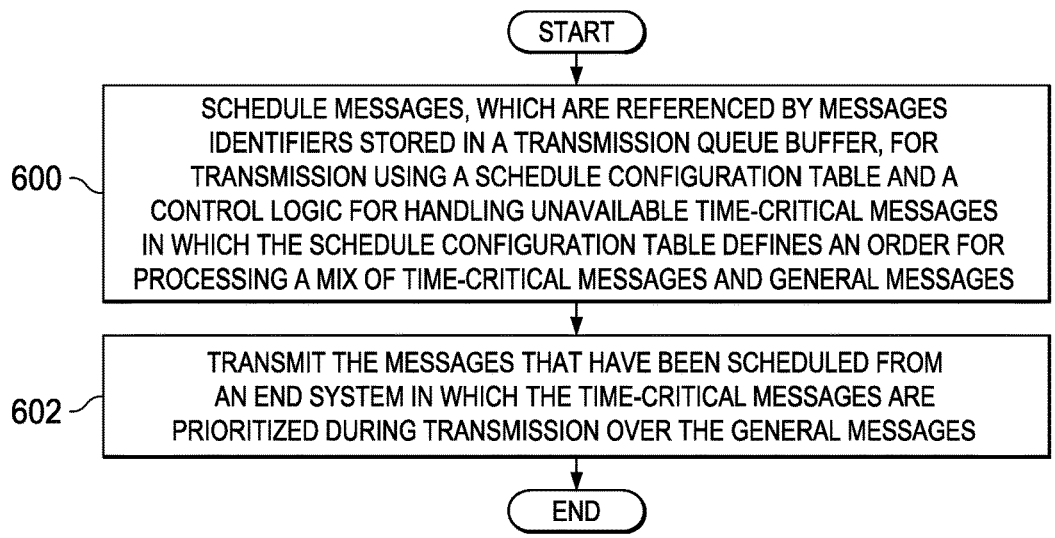
FIG. 6 is an illustration of a flowchart of a process for managing messages for scheduling and transmission in accordance with an illustrative embodiment.

With reference now to FIG. 6, an illustration of a flowchart of a process for managing messages for scheduling and transmission is depicted in accordance with an illustrative embodiment. The process illustrated in FIG. 6 may be implemented within end system 104 in FIGS. 1-2. In particular, this process may be implemented using scheduling system 130 in FIGS. 1-2.

The process begins by scheduling messages, which are referenced by message identifiers stored in a transmission queue buffer, for transmission using a schedule configuration table and a control logic for handling unavailable time-critical messages in which the schedule configuration table defines an order for processing a mix of time-critical messages and general messages (operation 600). The messages that have been scheduled are transmitted from an end system in which the time-critical messages are prioritized during transmission over the general messages (operation 602), with the process terminating thereafter.

Figure 7:
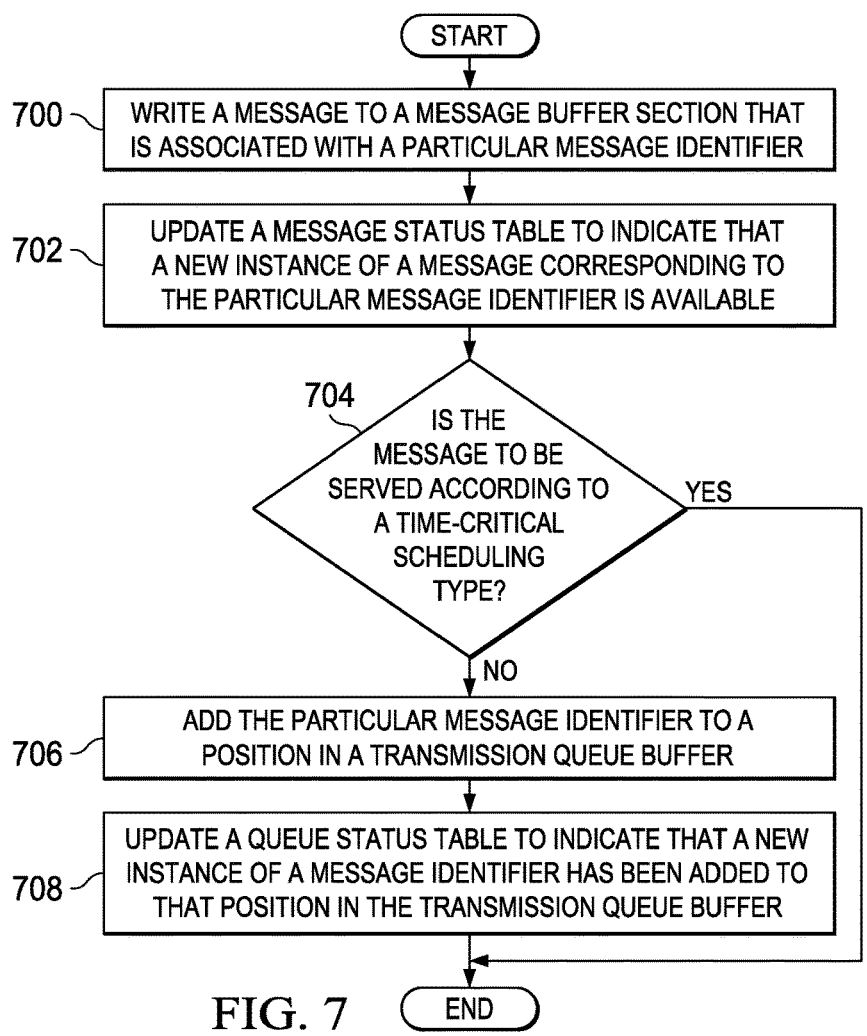
FIG. 7 is an illustration of a flowchart of a process for preparing a message for scheduling in accordance with an illustrative embodiment.

With reference now to FIG. 7, an illustration of a flowchart of a process for preparing a message for scheduling is depicted in accordance with an illustrative embodiment. The process illustrated in FIG. 7 may be implemented within end system 104 in FIGS. 1-2. In particular, this process may be implemented by a partition running an application, such as partition 114 running application 112 in FIGS. 1-2.

The process begins by writing a message to a message buffer section that is associated with a particular message identifier (operation 700). A message status table is updated to indicate that a new instance of a message corresponding to the particular message identifier is available (operation 702). Operation 702 may be performed by, for example, incrementing a write pointer corresponding to the particular message identifier in the message status table.

Thereafter, a determination is made as to whether the message is to be served according to a time-critical scheduling type (operation 704). If the message is of a time-critical scheduling type, the process terminates. Otherwise, if the message is not of a time-critical scheduling type, then the message is of a general scheduling type and the particular message identifier is added to a position in a transmission queue buffer (operation 706). A queue status table is updated to indicate that a new instance of a message identifier has been added to that position in the transmission queue buffer (operation 708), with the process terminating thereafter.

Figure 8:
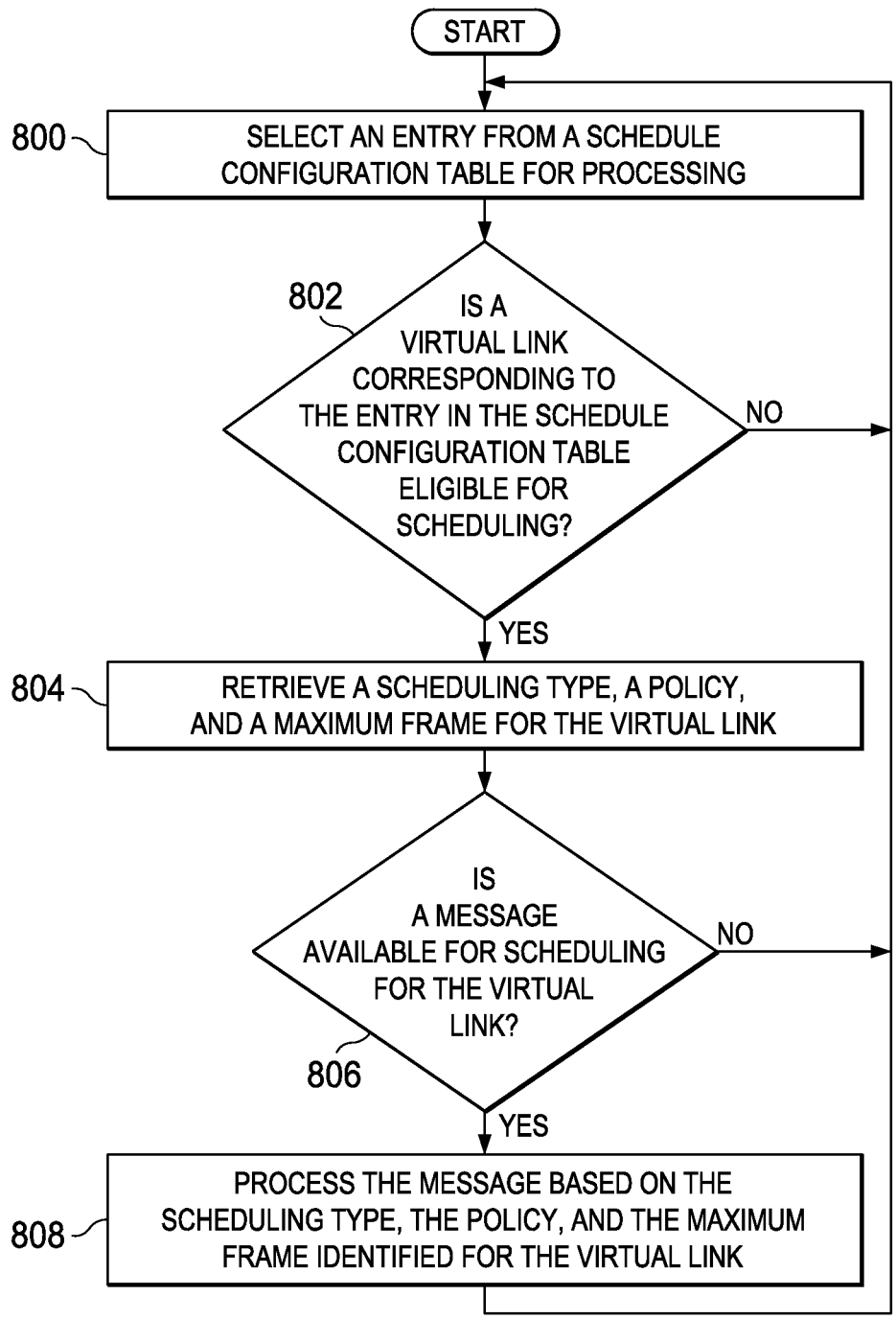
FIG. 8 is an illustration of a flowchart of a process for scheduling a message for transmission in accordance with an illustrative embodiment.

With reference now to FIG. 8, an illustration of a flowchart of a process for scheduling a message for transmission is depicted in accordance with an illustrative embodiment. The process illustrated in FIG. 8 may be implemented within end system 104 in FIGS. 1-2. In particular, this process may be implemented by a scheduler, such as scheduler 216 of scheduling system 130 in FIG. 2.

The process begins by selecting an entry from a schedule configuration table for processing (operation 800). In operation 800, this schedule configuration table may define an order for processing a mix of time-critical messages and general messages. A determination is made as to whether a virtual link corresponding to the entry in the schedule configuration table is eligible for scheduling (operation 802). If the virtual link is not eligible for processing, the process returns to operation 800 described above.

Otherwise, if the virtual link is eligible for processing, a scheduling type, a policy, and a maximum frame are retrieved for the virtual link (operation 804). Thereafter, a determination is made as to whether a message is available for scheduling for the virtual link (operation 806). If a message is not available for scheduling, the process returns to operation 800 described above.

Otherwise, if a message is available for scheduling, the message is processed based on the scheduling type, the policy, and the maximum frame identified for the virtual link (operation 808). The process then returns to operation 800 described above.

Figure 9:
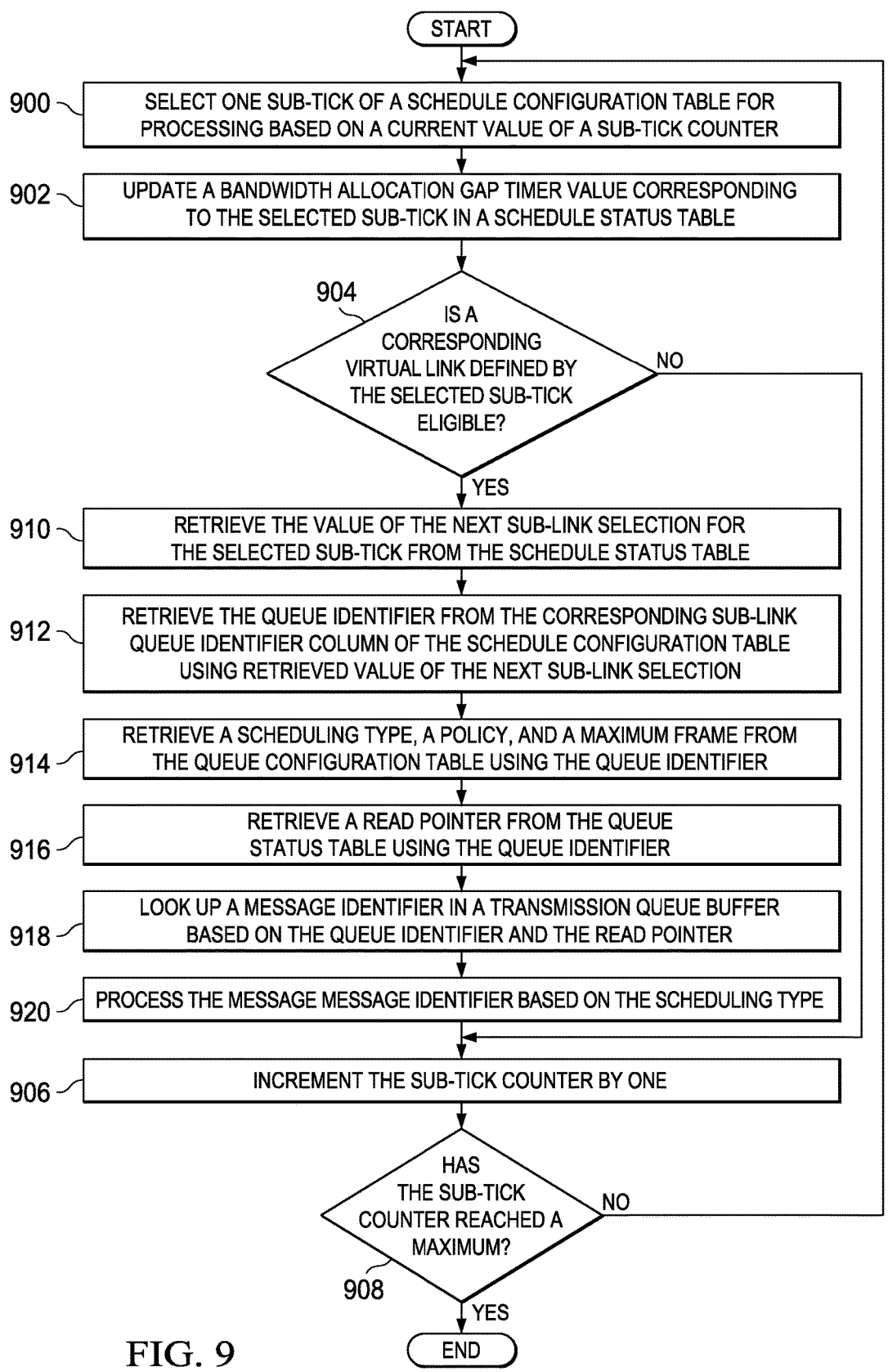
FIG. 9 is an illustration of a flowchart of a process for scheduling messages in accordance with an illustrative embodiment.

With reference now to FIG. 9, an illustration of a flowchart of a process for scheduling messages is depicted in accordance with an illustrative embodiment. The process illustrated in FIG. 9 may be implemented using scheduler 216 described in FIG. 2.

Prior to the process illustrated in FIG. 9 beginning, a precondition must be satisfied. This precondition is the loading and initializing of a schedule configuration table, a schedule status table, a message configuration table, a message status table, a queue configuration table, and a queue status table. Each of the schedule configuration table and the schedule status table may have at least as many entries as there are virtual links. In one illustrative example, these two tables may each have 256 entries.

Initializing the schedule configuration table includes initializing parameters such as, but not limited to, a transmit table period, a bandwidth allocation gap, a sub-link weight, and one or more sub-link queue identifiers for each sub-tick entry in the schedule configuration table. Each of the sub-link queue identifiers is for a virtual link that groups message identifiers that reference time-critical messages.

Initializing the schedule status table includes initializing parameters such as, but not limited to, a transmit table period timer value, a bandwidth allocation gap timer value, a next sub-link selection value, and a next weight count value for each sub-tick entry in the schedule status table. The transmit table period timer value and a bandwidth allocation gap timer value for each sub-tick entry in the schedule status table are initially set to the values of the transmit table period and the bandwidth allocation gap, respectively, for the corresponding sub-tick entry in the schedule configuration table.

The bandwidth allocation gap may be a multiple of the sub-tick unit. Further, the bandwidth allocation gap timer may be set to values that are multiples of the sub-tick unit.

The message configuration table includes entries for all message buffer sections of a transmit message buffer. In particular, each entry of the message configuration table identifies the message identifier of a message buffer section. For each message identifier referencing a particular message buffer section, the message configuration table identifies the base address of the transmit message buffer, the size of the transmit message buffer, and a queue identifier for the message identifier.

The message status table includes entries for all message identifiers referencing message buffers sections of the transmit message buffer. A write pointer and a read pointer are initialized at zero for each message identifier in the message status table.

Each entry of the queue configuration table references a particular queue identifier, and the queue depth, base address, scheduling type, policy, and maximum frame for that particular queue identifier. The values for these parameters are predefined.

Each entry of queue status table also references a particular queue identifier. A write pointer and a read pointer are initialized at zero for each queue identifier in the queue status table.

Once the appropriate configuration tables and status tables have been loaded and the appropriate parameters have been initialized, the scheduling process described in FIG. 9 may begin.

The process begins by selecting one sub-tick of a schedule configuration table for processing based on a current value of a sub-tick counter (operation 900). The selected sub-tick, s, corresponds to a virtual link.

A bandwidth allocation gap timer value corresponding to the selected sub-tick is updated in a schedule status table (operation 902). In one illustrative example, in operation 902, the bandwidth allocation gap timer value is decremented by one, which may be a unit that is a multiple of one sub-tick.

A determination is then made as to whether a corresponding virtual link defined by the selected sub-tick is eligible (operation 904). In operation 904, eligibility is based on whether the bandwidth allocation gap timer value for the selected sub-tick in the schedule status table has expired. The bandwidth allocation gap timer value has expired when the bandwidth allocation gap timer value equals zero. The corresponding virtual link is eligible when the bandwidth allocation gap timer value has expired.

If the corresponding virtual link is not eligible, the sub-tick counter is incremented by one (operation 906). A determination is made as to whether the sub-tick counter has reached a maximum (operation 908). If the sub-tick counter has reached a maximum, the process terminates. Otherwise, the process returns to operation 900 described above.

With reference again to operation 904, if the corresponding virtual link is eligible, the value of the next sub-link selection for the selected sub-tick is retrieved from the schedule status table (operation 910). The retrieved value of the next sub-link selection is used to retrieve the queue identifier from the corresponding sub-link queue identifier column of the schedule configuration table (operation 912).

A scheduling type, a policy, and a maximum frame are retrieved from the queue configuration table using the queue identifier (operation 914). In operation 914, the scheduling type may be either a time-critical scheduling type or a general scheduling type. The policy and the maximum frame retrieved may not apply when the scheduling type is the general scheduling type. In this manner, the policy and the maximum frame that are retrieved may be null when the scheduling type is the general scheduling type. In this illustrative example, if the scheduling type is the time-critical scheduling type, the policy may be either an idle policy or an immediate policy.

A read pointer is retrieved from the queue status table using the queue identifier (operation 916). A message identifier is then looked up in a transmission queue buffer based on the queue identifier and the read pointer (operation 918). In operation 918, the queue identifier and the read pointer are used to identify an index value for the transmission queue buffer. For example, the queue identifier may be used to identify a base address for the transmission queue buffer in the queue configuration table. The sum of this base address and the value of the read pointer retrieved from the queue status table form an index value for the transmission queue buffer. The message identifier in the position in the transmission queue buffer associated with this index value is retrieved.

Thereafter, the message identifier is processed based on the scheduling type (operation 920). Performing operation 920 may include taking into account the policy and maximum frame when the scheduling type is a time-critical scheduling type. The process then proceeds to operation 906 as described above.

Figure 10A:
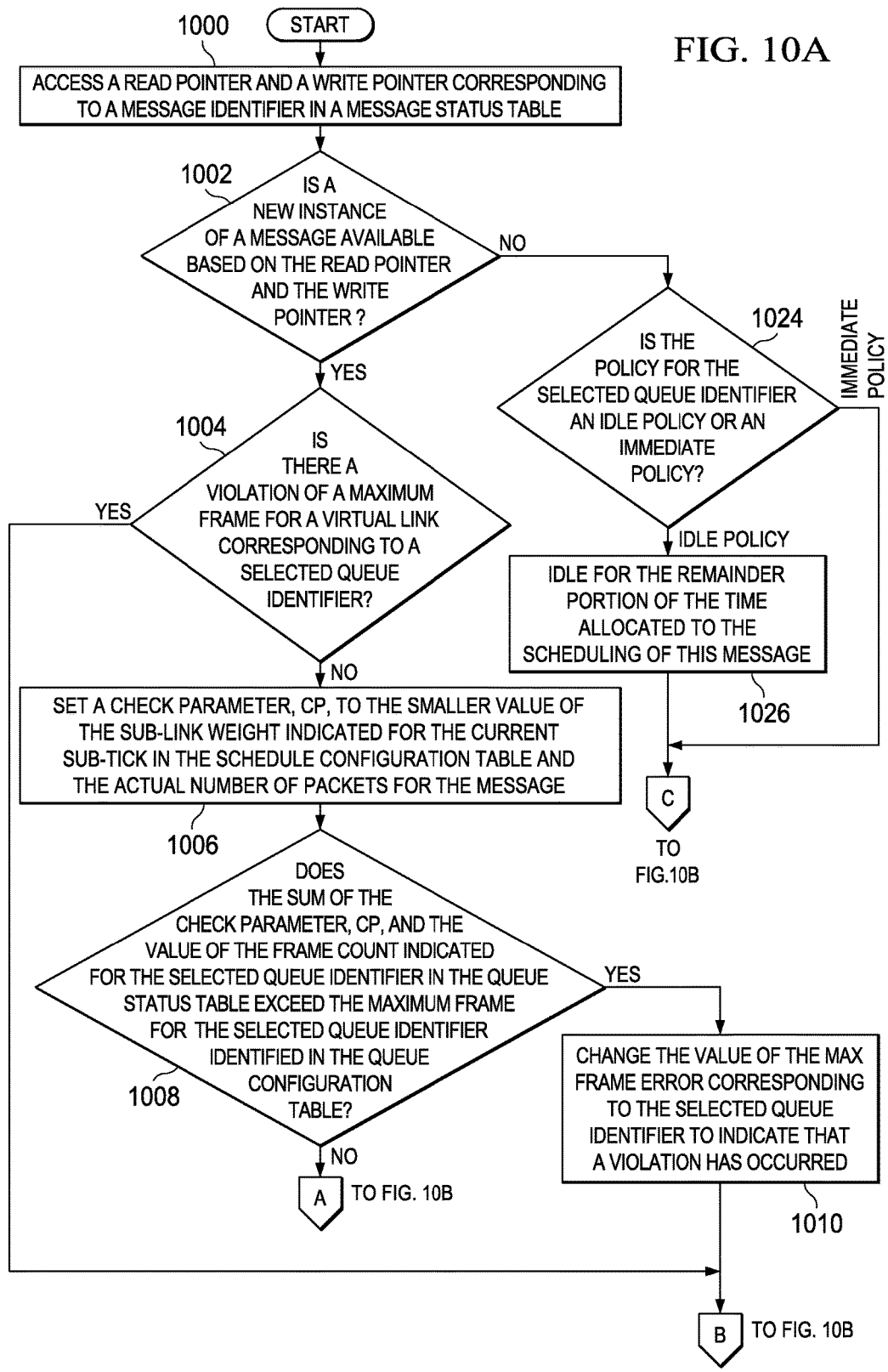
FIGS. 10A and 10B are illustrations of a flowchart of a process for processing a message based on a time-critical scheduling type in accordance with an illustrative embodiment.
Figure 10B:
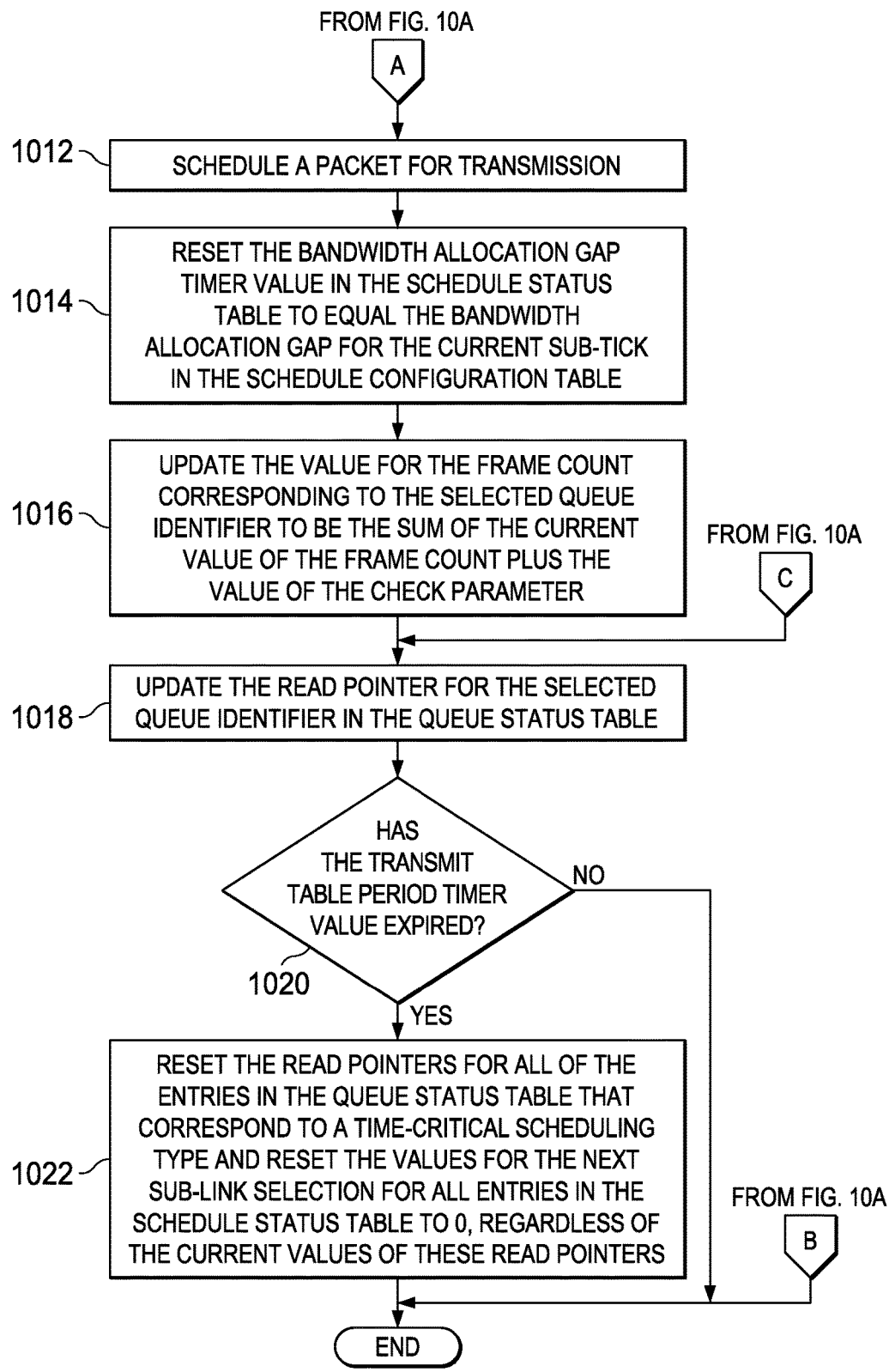

With reference now to FIGS. 10A and 10B, an illustration of a flowchart of a process for processing a message based on a time-critical scheduling type is depicted in accordance with an illustrative embodiment. The process illustrated in FIGS. 10A and 10B may be implemented using scheduler 216 in FIG. 2.

The process begins by accessing a read pointer and a write pointer corresponding to a message identifier in a message status table (operation 1000). In one illustrative example, this message identifier may be the message identifier found in operation 918 in FIG. 9.

A determination is made as to whether a new instance of a message is available based on the read pointer and the write pointer (operation 1002). In one illustrative example, in operation 1002, a new instance of a message is considered available when the read pointer and the write pointer in the message status table are different.

If a new instance of a message is available, a determination is made as to whether there is a violation of a maximum frame for a virtual link corresponding to a selected queue identifier (operation 1004). In one illustrative example, this selected queue identifier may be the queue identifier retrieved in operation 912 in FIG. 9. Further, the maximum frame may be the maximum frame retrieved in operation 914 in FIG. 9. The value in the max frame error column corresponding to the selected queue identifier indicates whether a violation of the maximum frame has occurred. For example, a value of "0" may indicate that no violation has occurred. A value of "1" may indicate that a violation has occurred.

If a violation has occurred, the process terminates, thereby halting further processing of the message. In other words, the process skips scheduling of the message. However, if no violation has occurred, a check parameter, cp, is set to the smaller value of the sub-link weight indicated for the current sub-tick in the schedule configuration table and the actual number of packets for the message (operation 1006).

A determination is made as to whether the sum of the check parameter, cp, and the value of the frame count indicated for the selected queue identifier in the queue status table exceeds the maximum frame for the selected queue identifier identified in the queue configuration table (operation 1008). If the sum of the check parameter, cp, and the value of the frame count exceeds the maximum frame, the value of the max frame error corresponding to the selected queue identifier is changed to indicate that a violation has occurred (operation 1010), with the process terminating thereafter.

Otherwise, the packets of the message are scheduled for transmission (operation 1012). The bandwidth allocation gap timer value in the schedule status table is reset to equal the bandwidth allocation gap for the current sub-tick in the schedule configuration table (operation 1014). The value for the frame count corresponding to the selected queue identifier is updated to be the sum of the current value of the frame count plus the value of the check parameter (operation 1016).

The read pointer for the selected queue identifier is then updated in the queue status table (operation 1018). In one illustrative example, the read pointer may be incremented by one and then wrapped around based on the queue depth corresponding to the selected queue identifier in the queue configuration table. For example, if the queue depth is set to 4, then the read pointer may be updated from 0 to 1, from 1 to 2, from 2 to 3, or from 3 back to 0.

Thereafter, a determination is made as to whether the transmit table period timer value has expired (operation 1020). If the transmit table period timer value has not expired, the process terminates. If the transmit table period timer value has expired, the read pointers for all of the entries in the queue status table that correspond to a time-critical scheduling type are reset and the values for the next sub-link selection for all entries in the schedule status table are reset to 0, regardless of the current values of these read pointers (operation 1022), with the process terminating thereafter.

With reference again to operation 1002, if a new instance of a message is not available, the process determines whether the policy for the selected queue identifier is an idle policy or an immediate policy (operation 1024). If the policy is the immediate policy, the process proceeds to operation 1018 described above.

Otherwise, if the policy is the idle policy, the process idles for the remainder portion of the time allocated to the scheduling of this message (operation 1026). In one illustrative example, the scheduler idles for an allocated total time for the message. This allocated total time may be the product of the maximum frame and the bandwidth allocation gap time interval. After idling, the process proceeds to operation 1018 described above.

Figure 11:
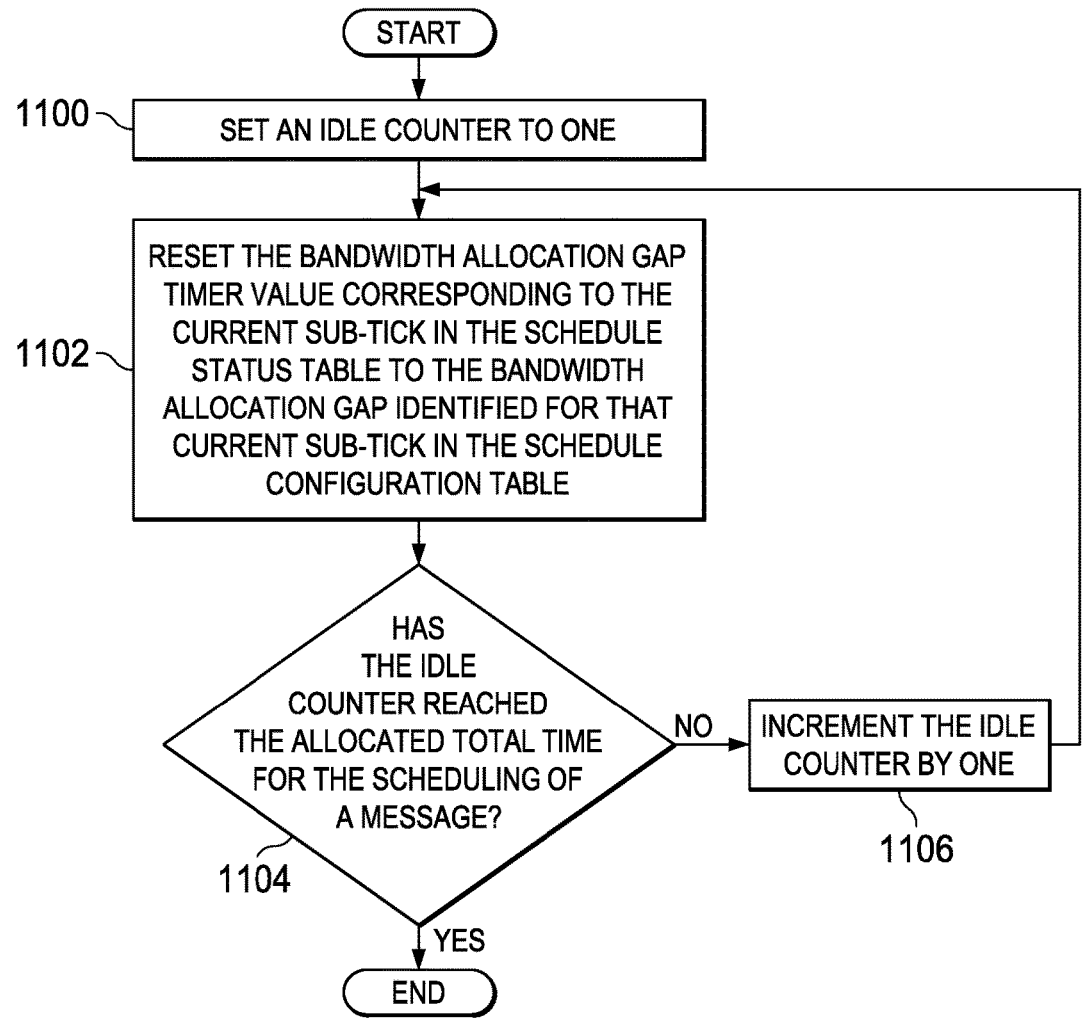
FIG. 11 is an illustration of a flowchart of a process for idling when a message is not available in accordance with an illustrative embodiment.

With reference now to FIG. 11, an illustration of a flowchart of a process for idling when a message is not available is depicted in accordance with an illustrative embodiment. The process illustrated in FIG. 11 may be implemented using scheduler 216 in FIG. 2.

The process begins by setting an idle counter to one (operation 1100). In one illustrative example, the idle counter may be in the queue status table. Next, the bandwidth allocation gap timer value corresponding to the current sub-tick in the schedule status table is reset to the bandwidth allocation gap identified for that current sub-tick in the schedule configuration table (operation 1102).

A determination is then made as to whether the idle counter has reached the allocated total time for the scheduling of a message (operation 1104). The allocated total time may be also referred to as the maximum frame bandwidth allocation gap time to mature cycles. If the service time allotted for a sub-tick is, for example, 76 micro slices in which each micro slice is about 10 nanoseconds, then the allocated total time is 76 micro slices. In this example, the idle counter counts from 1 to 76.

If the idle counter has not reached the allocated total time, the idle counter is incremented by one (operation 1106), with the process then returning to operation 1102 described above. Otherwise, if the idle counter has reached the allocated total time, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 12:
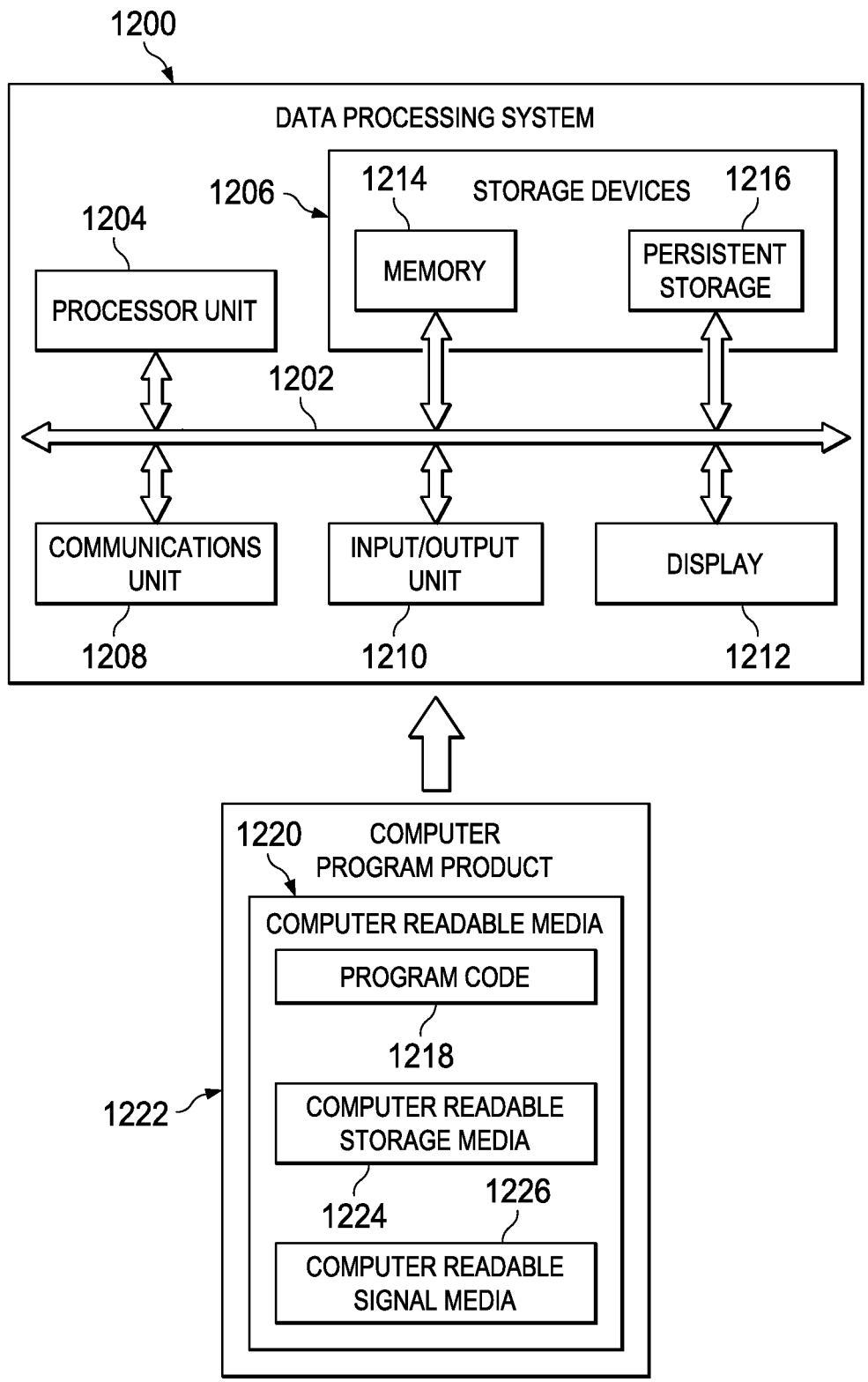
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement any one of plurality of end systems 102 in FIG. 1. As one illustrative example, data processing system 1200 may be used to implement computer system 105 in FIG. 1. As depicted, data processing system 1200 includes communications framework 1202, which provides communications between processor unit 1204, storage devices 1206, communications unit 1208, input/output unit 1210, and display 1212. In some cases, communications framework 1202 may be implemented as a bus system.

Processor unit 1204 is configured to execute instructions for software to perform a number of operations. Processor unit 1204 may comprise a number of processors, a multi-processor core, and/or some other type of processor, depending on the implementation. In some cases, processor unit 1204 may take the form of a hardware unit, such as a circuit system, an application-specific integrated circuit (ASIC), a programmable logic device, or some other suitable type of hardware unit.

Instructions for the operating system, applications, and/or programs run by processor unit 1204 may be located in storage devices 1206. Storage devices 1206 may be in communication with processor unit 1204 through communications framework 1202. As used herein, a storage device, also referred to as a computer readable storage device, is any piece of hardware capable of storing information on a temporary and/or permanent basis. This information may include, but is not limited to, data, program code, and/or other information.

Memory 1214 and persistent storage 1216 are examples of storage devices 1206. Memory 1214 may take the form of, for example, a random access memory or some type of volatile or non-volatile storage device. Persistent storage 1216 may comprise any number of components or devices. For example, persistent storage 1216 may comprise a hard drive, a flash memory, a rewritable optical disk, a rewritable magnetic tape, or some combination of the above. The media used by persistent storage 1216 may or may not be removable.

Communications unit 1208 allows data processing system 1200 to communicate with other data processing systems and/or devices. Communications unit 1208 may provide communications using physical and/or wireless communications links.

Input/output unit 1210 allows input to be received from and output to be sent to other devices connected to data processing system 1200. For example, input/output unit 1210 may allow user input to be received through a keyboard, a mouse, and/or some other type of input device. As another example, input/output unit 1210 may allow output to be sent to a printer connected to data processing system 1200.

Display 1212 is configured to display information to a user. Display 1212 may comprise, for example, without limitation, a monitor, a touch screen, a laser display, a holographic display, a virtual display device, and/or some other type of display device.

In this illustrative example, the processes of the different illustrative embodiments may be performed by processor unit 1204 using computer-implemented instructions. These instructions may be referred to as program code, computer usable program code, or computer readable program code and may be read and executed by one or more processors in processor unit 1204.

In these examples, program code 1218 is located in a functional form on computer readable media 1220, which is selectively removable, and may be loaded onto or transferred to data processing system 1200 for execution by processor unit 1204. Program code 1218 and computer readable media 1220 together form computer program product 1222. In this illustrative example, computer readable media 1220 may be computer readable storage media 1224 or computer readable signal media 1226.

Computer readable storage media 1224 is a physical or tangible storage device used to store program code 1218 rather than a medium that propagates or transmits program code 1218. Computer readable storage media 1224 may be, for example, without limitation, an optical or magnetic disk or a persistent storage device that is connected to data processing system 1200.

Alternatively, program code 1218 may be transferred to data processing system 1200 using computer readable signal media 1226. Computer readable signal media 1226 may be, for example, a propagated data signal containing program code 1218. This data signal may be an electromagnetic signal, an optical signal, and/or some other type of signal that can be transmitted over physical and/or wireless communications links.

The illustration of data processing system 1200 in FIG. 12 is not meant to provide architectural limitations to the manner in which the illustrative embodiments may be implemented. The different illustrative embodiments may be implemented in a data processing system that includes components in addition to or in place of those illustrated for data processing system 1200. Further, components shown in FIG. 12 may be varied from the illustrative examples shown.

Thus, the illustrative embodiments provide a method and apparatus for seamlessly integrating the scheduling of time-critical messages along with the scheduling of general messages. In one illustrative example, a scheduling system, such as scheduling system 130 described in FIGS. 1-3, may use a unified schedule configuration table and a unified schedule status table to define the order for processing a mix of time-critical messages and general messages.

In one illustrative example, scheduling system 130 in FIGS. 1-2 may use mechanisms that designate a scheduling type, a policy, a transmit table period, and a maximum frame for processing messages. The scheduling type may indicate whether a message that is referenced by a particular message identifier is a time-critical message or a general message. When the message is a time-critical message, the policy may determine how scheduler 216 of scheduling system 130 in FIG. 2 handles empty positions in transmission queue buffer 226 in FIG. 2.

For example, the policy may be either an idle policy or an immediate policy. When an idle policy is used, the scheduler is configured to spend the total time allocated for serving a particular message identifier, regardless of the availability of a new instance of a message referenced by the message identifier. When an immediate policy is used, the scheduler quickly serves time-critical messages by efficiently skipping processing of message identifiers for which new instances of messages are unavailable.

The transmit table period is the cycle for the sending of time-critical messages within a major frame. In one illustrative example, the transmit table period may be a fraction of or equal to the major frame for time-critical messages. The maximum frame may be the maximum number of packets that can be scheduled for one message in one transmit table period cycle. The scheduling status of time-critical messages may be reset at the start of each transmit table period cycle.

As one illustrative example, the current position of the sub-tick entry that is being serviced by a scheduler, such as scheduler 216 in FIG. 2, may be reset to an initial position at the start of each transmit table period cycle. For example, when the major frame cycle for a set of partitions in an end system that is running a set of applications is about 200 milliseconds, the transmit table period may be set to a fraction of the major frame. As one illustrative example, the transmit table period may be set to 50 milliseconds. In one illustrative example, the scheduler is configured to complete scheduling of all time-critical messages at the end of each transmit table period cycle.

Further, the illustrative embodiments provide a scheduler, such as scheduler 216 in FIG. 2, that uses a scheduling algorithm that supports both time-critical scheduling and BAG-based scheduling in alignment with the major frame cycles of an end system. Time-critical scheduling may process time-critical messages according to particular policies and constraints that allow time-critical messages to be handled in a special manner that is still consistent and compatible with a bandwidth allocation gap-based message scheduling approach.

The illustrative embodiments provide a method for pre-configuring a transmission queue buffer, such as transmission queue buffer 226 in FIG. 2, that holds the message identifiers for messages that are to be scheduled for transmission. In one illustrative example, a portion of the transmission queue buffer is prefilled with time-critical message identifiers in a predetermined order. This predetermined ordering may help ensure the predictability in the servicing of time-critical messages and prevent aberrations in the ordering of the time-critical messages.

With the scheduling system described by the different illustrative examples, a worst-case scheduling latency may be predictably and accurately computed. Being able to predictably and accurately compute the worst-case scheduling latency as compared to artificially estimating the upper bounds of the worst-case scheduling latency may be better for conducting performance qualifications and certifications of an end system.

In this manner, the different illustrative embodiments provide a method and apparatus for managing the scheduling and transmission of messages. The scheduling approach described above enables the flexibility of seamlessly mixing time-critical messages and bandwidth allocation gap-based messages and allows for a variety of options during scheduling. Further, time-critical messages may be prioritized over general messages during transmission.

The description of the different illustrative embodiments has been presented for illustration and description purposes, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing messages, the method comprising:
    providing, in a storage of a message processing system having a scheduler, a set of unified scheduling tables, the set of unified scheduling tables comprising a schedule configuration table and a schedule status table, wherein a pair of entries in the schedule configuration table and the schedule status table defines an independent virtual link or sub-link with pre-defined values for attributes defined in the schedule configuration table;
    scheduling the messages, which are referenced by message identifiers stored in a transmission queue buffer, for transmission using the schedule configuration table and a control logic for handling unavailable time-critical messages, wherein the schedule configuration table defines an order for processing a mix of time-critical messages and general messages; and
    transmitting the messages that have been scheduled from an end system using a designated virtual link or sub-link based on a corresponding value in the schedule configuration table, wherein the time-critical messages are prioritized during transmission over the general messages.

2. The method of claim 1, further comprising:
prefilling a section of the transmission queue buffer with time-critical message identifiers in a predetermined order.

3. The method of claim 1, wherein scheduling the messages comprises:
determining whether a virtual link corresponding to an entry of the schedule configuration table is eligible for scheduling; and
retrieving a message identifier from the transmission queue buffer in response to a determination that the virtual link is eligible for scheduling.

4. The method of claim 3, wherein scheduling the messages further comprises:
determining whether a message referenced by the message identifier is available for scheduling; and
packetizing the message to form a packet in response to a determination that the message is available for scheduling.

5. The method of claim 3, wherein retrieving the message identifier comprises:
retrieving a queue identifier assigned to a section of the transmission queue buffer using the schedule configuration table and a schedule status table; and
retrieving a scheduling type from a queue configuration table and a read pointer from a queue status table based on the queue identifier.

6. The method of claim 5, wherein retrieving the message identifier further comprises:
looking up the message identifier based on the queue identifier and the read pointer.

7. The method of claim 6, wherein retrieving the message identifier further comprises:
retrieving a policy and a maximum frame constraint that are predefined when the scheduling type is a time-critical scheduling type, wherein the policy is used to determine the control logic used for handling the unavailable time-critical messages.

8. The method of claim 7, wherein scheduling the messages further comprises:
determining whether a new instance of a message is available in a message buffer section referenced by the message identifier; and
processing the message according to the policy and the maximum frame constraint.

9. The method of claim 1, further comprising:
writing a message into a message buffer section associated with a message identifier.

10. The method of claim 9, wherein writing the message comprises:
writing a time-critical message into an entry of the message buffer section that is associated with a time-critical message identifier, wherein the time-critical message identifier is prefilled in a position of the transmission queue buffer.

11. The method of claim 1, wherein scheduling the messages comprises:
packetizing a message into a set of packets; and
placing the set of packets in a low priority queue of a packet buffer when the message is a general message, and in a high priority queue of the packet buffer when the message is a time-critical message.

12. The method of claim 11, wherein transmitting the messages comprises:
transmitting all packets in the high priority queue prior to serving the low priority queue.

13. The method of claim 1, further comprising:
preconfiguring a subset of entries in the schedule configuration table for the time-critical messages, wherein the subset of entries is smaller than a remaining portion of entries in the schedule configuration table that are designated for the general messages.

14. The method of claim 1, further comprising:
serving each entry of the schedule configuration table during a sub-tick that is defined by a major frame cycle.

15. An apparatus comprising:
a memory that includes a transmission queue buffer and stores a schedule configuration table and a schedule status table, wherein a pair of entries in the schedule configuration table and the schedule status table defines an independent virtual link or sub-link, wherein the schedule configuration table defines an order for processing a mix of time-critical messages and general messages; and
a scheduler that schedules messages referenced by message identifiers stored in the transmission queue buffer for transmission on a designated virtual link or sub-line based on a corresponding value in the schedule configuration table.

16. The apparatus of claim 15, further comprising:
a transmission controller that transmits the messages that are scheduled by the scheduler, wherein the time-critical messages are prioritized during transmission over the general messages.

17. The apparatus of claim 15, further comprising:
a message buffer comprising:
a plurality of message buffer sections, wherein each of the plurality of message buffer sections is associated with a message identifier.

18. The apparatus of claim 15, wherein each entry of the schedule configuration table is served during a sub-tick, and wherein the sub-tick is determined by a major frame cycle.

19. The apparatus of claim 15, wherein the transmission queue buffer comprises:
a plurality of sections in which each of the plurality of sections is referenced by a queue identifier.

20. The apparatus of claim 15, wherein a section of the transmission queue buffer is statically preconfigured with time-critical message identifiers referencing entries in a message buffer section of a message buffer.

21. The apparatus of claim 15, further comprising:
a packet buffer in the memory, wherein the packet buffer includes a low priority queue for packets of general messages and a high priority queue for packets of time-critical messages.

22. The apparatus of claim 15, wherein the scheduler schedules a message according to a selected policy that is selected from one of an idle policy and an immediate policy.

23. The apparatus of claim 15, wherein the schedule configuration table comprises a subset of entries that are preconfigured for the time-critical messages, and wherein the subset of entries is smaller than a remaining portion of entries in the schedule configuration table that are designated for general messages.

24. The apparatus of claim 15, further comprising:
a partition designated for an application, wherein an application writes a message to a message buffer section that is referenced by a corresponding message identifier.

25. The apparatus of claim 24, wherein the corresponding message identifier is prefilled in a position in the transmission queue buffer when the message buffer section is associated with a time-critical message identifier.

26. A scheduling system comprising:
a bus system;
a storage device connected to the bus system, wherein the storage device includes program code; and
a processor unit connected to the bus system, wherein the processor unit processes the program code to prefill one section of a plurality of sections in a transmission queue buffer with time-critical message identifiers; to define an order for processing a mix of time-critical messages and general messages in a schedule configuration table and a schedule status table, wherein a pair of entries in the schedule configuration table and the schedule status table defines an independent virtual link or sub-link; and to schedule messages referenced by message identifiers stored in the transmission queue buffer for transmission on a designated virtual link or sub-line based on the order defined in the schedule configuration table.

* * * * *

UNITED STATES PATENT AND TRADEMARK OFFICE
CERTIFICATE OF CORRECTION

PATENT NO. : 10,033,829 B2
APPLICATION NO. : 14/832783
DATED : July 24, 2018
INVENTOR(S) : Ling et al.

It is certified that error appears in the above-identified patent and that said Letters Patent is hereby corrected as shown below:

In the Claims

Column 33, Line 24, Claim 5 change "a schedule status table" to --the schedule status table--
Column 34, Line 21, Claim 15 change "sub-line" to --sub-link--
Column 34, Line 58, Claim 23 change "for general messages" to --for the general messages--
Column 34, Line 60, Claim 24 change "an application" to --the application--
Column 35, Line 17, Claim 26 change "sub-line" to --sub-link--

Signed and Sealed this
Thirtieth Day of October, 2018

Andrei Iancu
*Director of the United States Patent and Trademark Office*